US012684044B2

(12) United States Patent
Bhatt et al.

(10) Patent No.: US 12,684,044 B2
(45) Date of Patent: **\*Jul. 14, 2026**

(54) SYSTEMS AND METHODS FOR BUILDING FUNNEL WEBSITES USING ARTIFICIAL INTELLIGENCE IN A TIERED SOFTWARE FRAMEWORK

(71) Applicant: HighLevel Inc., Dallas, TX (US)

(72) Inventors: Hardik Bhatt, Noida (IN); Prakhar Agarwal, Bangalore (IN); Ajay Dev, Kochi (IN); Shaun Clark, Eugene, OR (US); Robin Alex, Dallas, TX (US); Varun Vairavan, Doha (QA)

(73) Assignee: Highlevel Inc., Dallas, TX (US)

( \* ) Notice: Subject to any disclaimer, the term of this patent is extended or adjusted under 35 U.S.C. 154(b) by 71 days.

This patent is subject to a terminal disclaimer.

(21) Appl. No.: 18/829,456

(22) Filed: Sep. 10, 2024

(65) Prior Publication Data

US 2025/0080617 A1     Mar. 6, 2025

Related U.S. Application Data

(63) Continuation of application No. 18/651,892, filed on May 1, 2024, now Pat. No. 12,120,190, which is a continuation of application No. 18/460,891, filed on Sep. 5, 2023, now Pat. No. 12,010,184.

(51) Int. Cl.
| | |
|---|---|
| *G06F 15/177* | (2006.01) |
| *H04L 41/16* | (2022.01) |
| *H04L 67/00* | (2022.01) |

(52) U.S. Cl.
CPC .............. *H04L 67/34* (2013.01); *H04L 41/16* (2013.01)

(58) Field of Classification Search
CPC ................................ H04L 67/34; H04L 41/16
USPC ......................................................... 709/220
See application file for complete search history.

(56) References Cited

U.S. PATENT DOCUMENTS

| | | | | |
|---|---|---|---|---|
| 9,087,035 | B1 * | 7/2015 | Bandaru | ............... G06F 40/186 |
| 10,152,727 | B2 * | 12/2018 | Kaiser | .................. G06Q 30/015 |
| 10,503,804 | B1 * | 12/2019 | Walters | .................. G06N 3/126 |
| 10,846,357 | B2 * | 11/2020 | Dickerson | ............. G06F 16/972 |
| 11,080,754 | B1 * | 8/2021 | Han | ................... G06Q 30/0201 |
| 11,275,815 | B2 * | 3/2022 | Siani Cohen | ......... G06F 16/958 |
| 11,593,841 | B2 * | 2/2023 | Han | ................... G06Q 30/0267 |
| 11,755,979 | B2 * | 9/2023 | Legrand | .................. H04L 67/02 |
| | | | | 705/7.39 |
| 12,010,184 | B1 * | 6/2024 | Bhatt | ..................... H04L 67/34 |

(Continued)

*Primary Examiner* — Alicia Baturay

(74) *Attorney, Agent, or Firm* — Aambell PC

(57) ABSTRACT

Embodiments of a method for building funnel websites using artificial intelligence (AI) comprise providing a first tier, a second tier and a third tier, wherein: data in the first tier is accessible at the first tier and inaccessible at the second tier and the third tier, data in the second tier is accessible at the first tier and the second tier and inaccessible at the third tier, and data in the third tier is accessible at the first tier, the second tier and the third tier; providing, at the first tier, an AI engine; automatically generating, at the first tier using the AI engine, funnel website templates based on previously generated funnel websites; automatically building, at the first tier using the AI engine, a new funnel website using the funnel website templates for a subscriber to the third tier; and automatically deploying the new funnel website at the third tier.

20 Claims, 12 Drawing Sheets

(56) References Cited

U.S. PATENT DOCUMENTS

| | | | |
|---|---|---|---|
| 12,120,190 B1* | 10/2024 | Bhatt ...................... | H04L 41/16 |
| 2008/0177600 A1* | 7/2008 | McCarthy .......... | G06Q 30/0204 |
| | | | 705/7.33 |
| 2009/0106081 A1* | 4/2009 | Burgess ............ | G06Q 30/0277 |
| | | | 705/14.73 |
| 2014/0278955 A1* | 9/2014 | Nygaard ........... | G06Q 30/0251 |
| | | | 705/14.49 |
| 2018/0300748 A1* | 10/2018 | Flaks ................ | G06Q 30/0243 |
| 2019/0228083 A1* | 7/2019 | Yim ........................ | H04L 67/02 |
| 2019/0340230 A1* | 11/2019 | Gall ...................... | G06F 40/143 |
| 2023/0298568 A1* | 9/2023 | Moya ..................... | G10L 15/22 |
| | | | 704/270.1 |
| 2024/0053712 A1* | 2/2024 | Nixon ................ | G05B 19/4186 |

* cited by examiner

Figure 1:
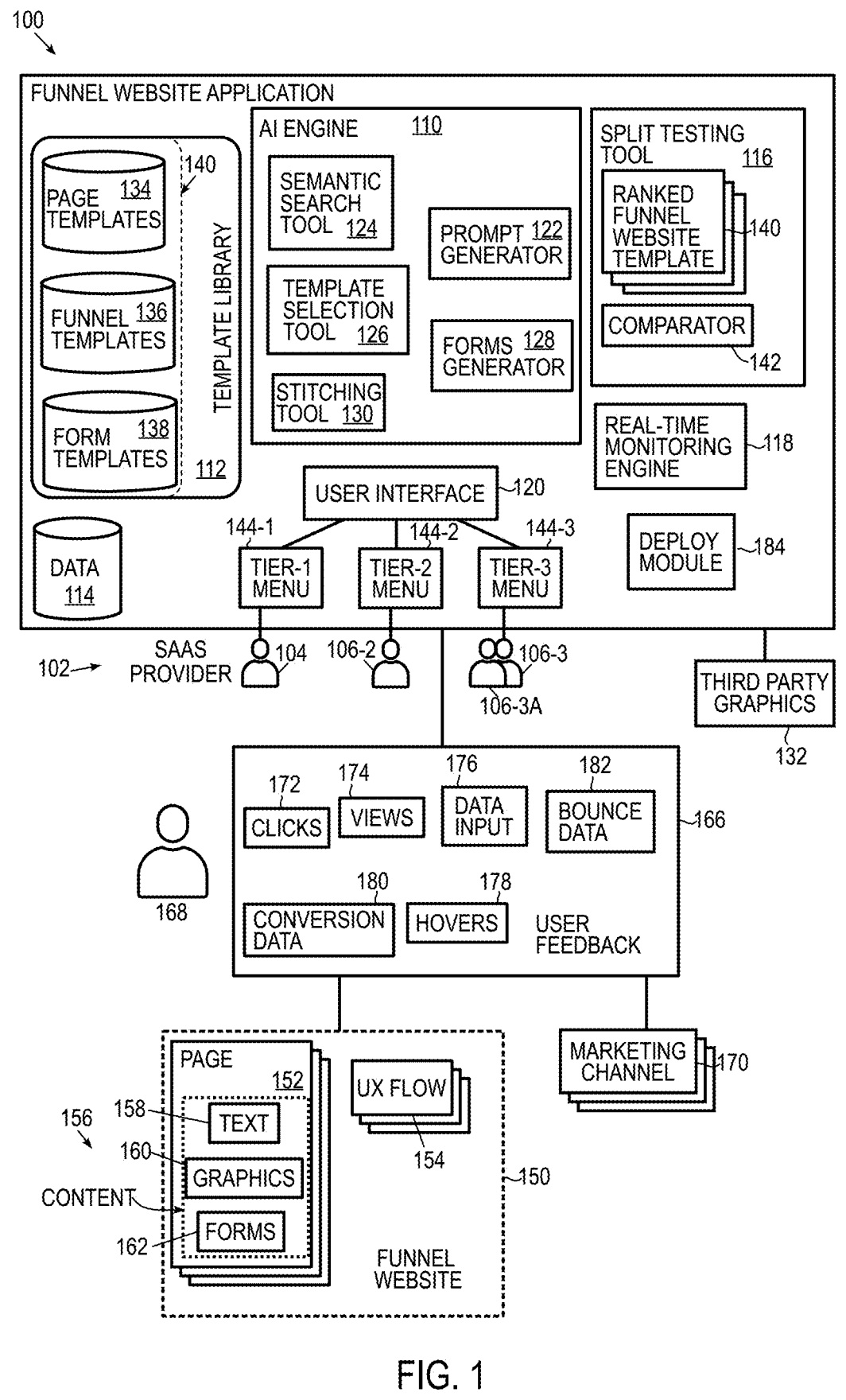

100

FUNNEL WEBSITE APPLICATION

AI ENGINE    110

SEMANTIC SEARCH TOOL  124

PROMPT 122 GENERATOR

TEMPLATE SELECTION TOOL  126

FORMS 128 GENERATOR

STITCHING TOOL  130

SPLIT TESTING TOOL    116

RANKED FUNNEL WEBSITE TEMPLATE    140

COMPARATOR    142

REAL-TIME MONITORING ENGINE    118

DEPLOY MODULE    184

TEMPLATE LIBRARY

PAGE 134 TEMPLATES

FUNNEL 136 TEMPLATES

FORM 138 TEMPLATES    112

140

DATA 114

USER INTERFACE    120

144-1    144-2    144-3

TIER-1 MENU    TIER-2 MENU    TIER-3 MENU

SAAS PROVIDER    104    106-2    106-3

102

106-3A

THIRD PARTY GRAPHICS    132

168

172    174    176    182

CLICKS    VIEWS    DATA INPUT    BOUNCE DATA    166

180    178

CONVERSION DATA    HOVERS    USER FEEDBACK

PAGE    152

156    158    TEXT

160    GRAPHICS

CONTENT

162    FORMS

UX FLOW    154

150

FUNNEL WEBSITE

MARKETING CHANNEL    170

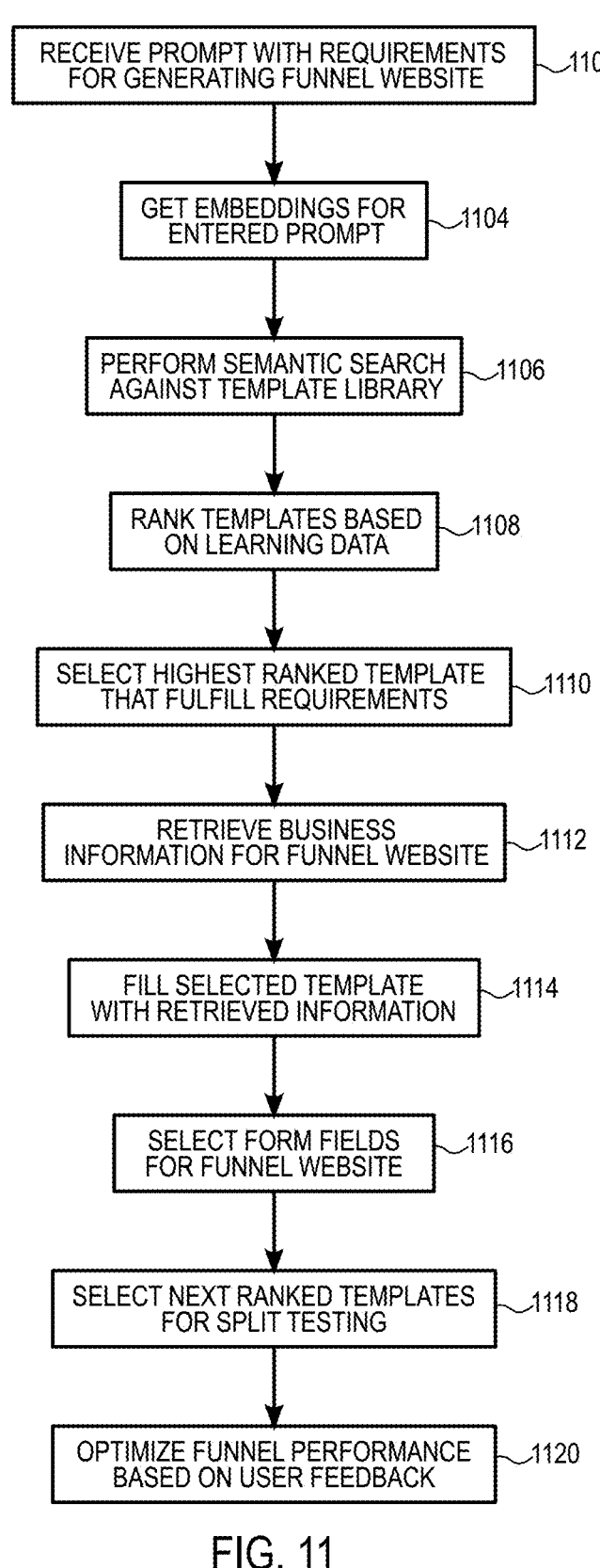

RECEIVE PROMPT WITH REQUIREMENTS FOR GENERATING FUNNEL WEBSITE ⌐1102

GET EMBEDDINGS FOR ENTERED PROMPT ⌐1104

PERFORM SEMANTIC SEARCH AGAINST TEMPLATE LIBRARY ⌐1106

RANK TEMPLATES BASED ON LEARNING DATA ⌐1108

SELECT HIGHEST RANKED TEMPLATE THAT FULFILL REQUIREMENTS ⌐1110

RETRIEVE BUSINESS INFORMATION FOR FUNNEL WEBSITE ⌐1112

FILL SELECTED TEMPLATE WITH RETRIEVED INFORMATION ⌐1114

SELECT FORM FIELDS FOR FUNNEL WEBSITE ⌐1116

SELECT NEXT RANKED TEMPLATES FOR SPLIT TESTING ⌐1118

OPTIMIZE FUNNEL PERFORMANCE BASED ON USER FEEDBACK ⌐1120

FIG. 11

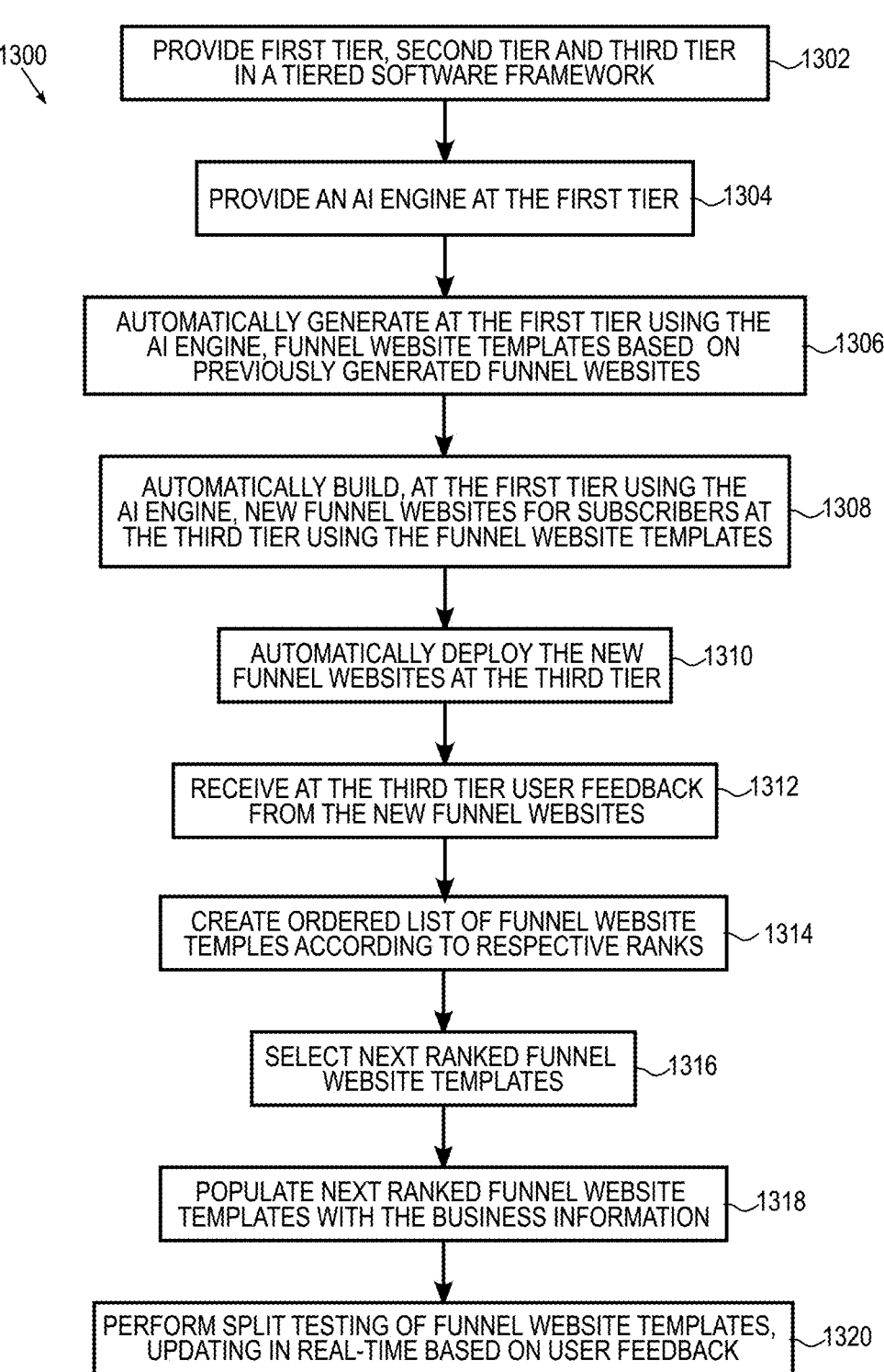

1300

PROVIDE FIRST TIER, SECOND TIER AND THIRD TIER IN A TIERED SOFTWARE FRAMEWORK — 1302

PROVIDE AN AI ENGINE AT THE FIRST TIER — 1304

AUTOMATICALLY GENERATE AT THE FIRST TIER USING THE AI ENGINE, FUNNEL WEBSITE TEMPLATES BASED ON PREVIOUSLY GENERATED FUNNEL WEBSITES — 1306

AUTOMATICALLY BUILD, AT THE FIRST TIER USING THE AI ENGINE, NEW FUNNEL WEBSITES FOR SUBSCRIBERS AT THE THIRD TIER USING THE FUNNEL WEBSITE TEMPLATES — 1308

AUTOMATICALLY DEPLOY THE NEW FUNNEL WEBSITES AT THE THIRD TIER — 1310

RECEIVE AT THE THIRD TIER USER FEEDBACK FROM THE NEW FUNNEL WEBSITES — 1312

CREATE ORDERED LIST OF FUNNEL WEBSITE TEMPLES ACCORDING TO RESPECTIVE RANKS — 1314

SELECT NEXT RANKED FUNNEL WEBSITE TEMPLATES — 1316

POPULATE NEXT RANKED FUNNEL WEBSITE TEMPLATES WITH THE BUSINESS INFORMATION — 1318

PERFORM SPLIT TESTING OF FUNNEL WEBSITE TEMPLATES, UPDATING IN REAL-TIME BASED ON USER FEEDBACK — 1320

FIG. 13

SYSTEMS AND METHODS FOR BUILDING FUNNEL WEBSITES USING ARTIFICIAL INTELLIGENCE IN A TIERED SOFTWARE FRAMEWORK

CROSS-REFERENCE TO RELATED APPLICATIONS

This Application is a continuation application under 35 U.S.C. § 120 claiming the benefit of priority to U.S. application Ser. No. 18/651,892, filed on May 1, 2024, which claims priority to U.S. application Ser. No. 18/460,891, filed on Sep. 5, 2023, entitled SYSTEMS AND METHODS FOR BUILDING FUNNEL WEBSITES USING ARTIFICIAL INTELLIGENCE IN A TIERED SOFTWARE FRAME-WORK. The disclosures of the prior applications are considered part of and are hereby incorporated by reference in their entireties in the disclosure of this Application.

TECHNICAL FIELD

The present disclosure relates to systems, techniques, and methods directed to building funnel websites using artificial intelligence (AI) in a tiered software framework.

BACKGROUND

AI is a growing field in computer science that uses machine learning models to make predictions, recommendations, or classifications based on input data. Revenue from the AI software market worldwide is expected to reach 126 billion dollars by 2025 according to some estimates. In some domains, such as marketing, AI has the potential to deliver highly targeted and personalized advertisements using behavioral analysis, pattern recognition, and other learning algorithms.

BRIEF DESCRIPTION OF THE DRAWINGS

Embodiments will be readily understood by the following detailed description in conjunction with the accompanying drawings. To facilitate this description, like reference numerals designate like elements. Embodiments are illustrated by way of example, and not by way of limitation, in the figures of the accompanying drawings.

FIG. 1 is a simplified block diagram illustrating an example funnel website application for building funnel websites using AI in a tiered software framework, according to some embodiments of the present disclosure.

FIG. 11 is a simplified flow diagram illustrating example operations associated with the funnel website application, according to some embodiments of the present disclosure.

FIG. 13 is a simplified flow diagram illustrating yet other example operations associated with the funnel website application, according to some embodiments of the present disclosure.

DETAILED DESCRIPTION

Overview

Figure 2:
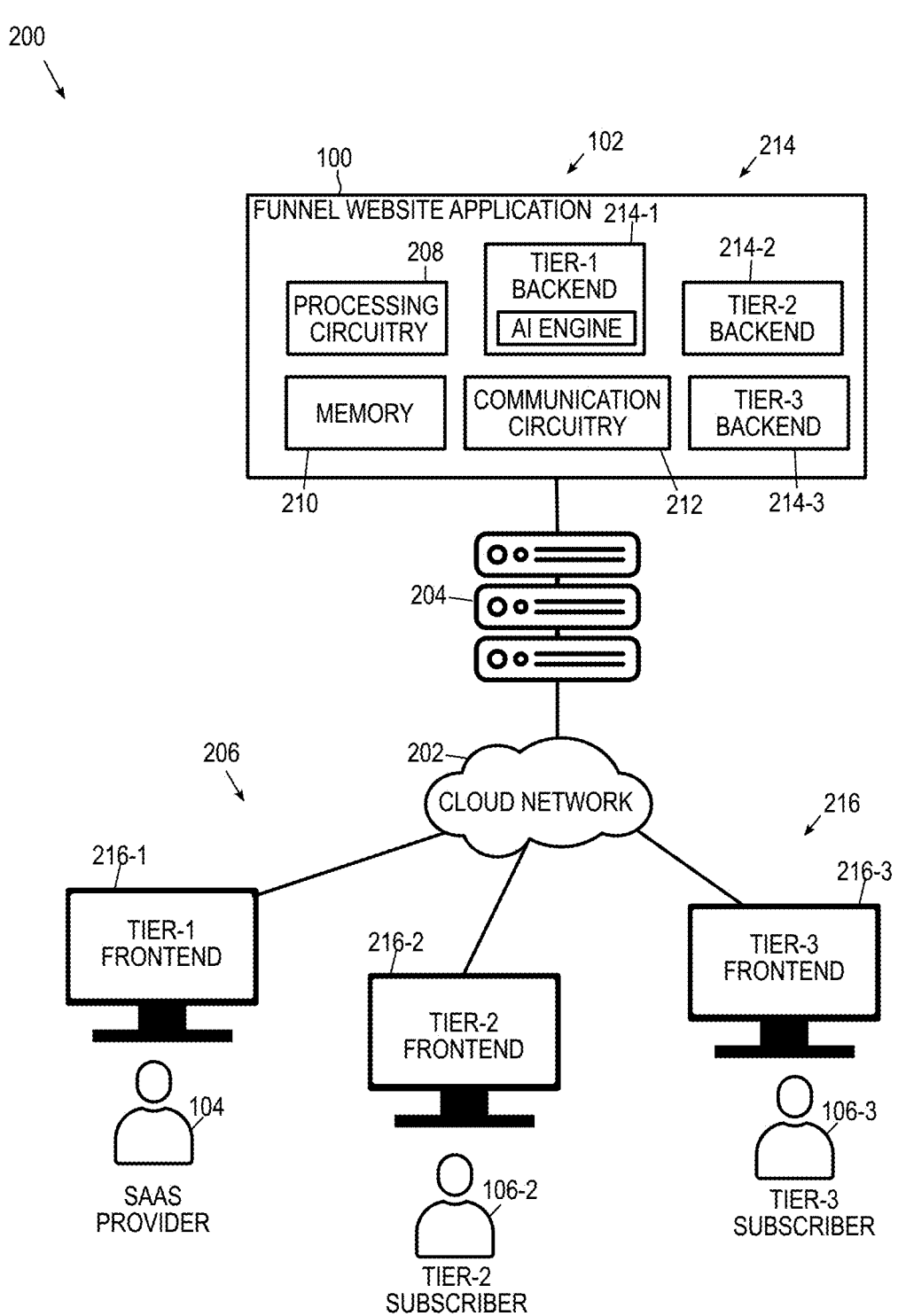
FIG. 2 is a simplified block diagram illustrating example details of the tiered software framework implementing the systems and methods for building funnel websites using AI, according to some embodiments of the present disclosure.

For purposes of illustrating the embodiments described herein, it is important to understand certain terminology and operations of technology networks. The following foundational information may be viewed as a basis from which the present disclosure may be properly explained. Such information is offered for purposes of explanation only and, accordingly, should not be construed in any way to limit the broad scope of the present disclosure and its potential applications.

AI uses machine learning models to make predictions, recommendations, and classifications. In general, machine learning models use algorithms to parse data, learn from the parsed data, and make informed decisions based on what it has learned. According to some classifications, deep learning models are subsets of machine learning models, being machine learning algorithms that operate in multiple layers, creating an artificial neural network. According to some other classifications, machine learning models are those that rely on human intervention to learn, whereas deep learning models automatically learn without human intervention. Because the learning algorithms are more relevant to the disclosure herein than any human intervention to provide training data, the former classification is employed herein, such that wherever "machine learning models" is used, it is intended that deep learning models are included as well.

Deep learning models in particular, enable AI algorithms such as generative AI models (e.g., ChatGPT™). In a general sense, AI algorithms have three qualities that differentiate them from other algorithms: intentionality, intelligence, and adaptability. As intentional algorithms, they make decisions, often using real-time data, combining information from a variety of different sources, analyzing the combined information instantly, and acting on insights derived from such data. As intelligent algorithms, they are capable of spotting patterns in underlying data. As adaptable algorithms, they learn and adapt their analyses based on shifting input data.

Recent advances in AI have made possible commercially available AI engines that expose application programming interfaces (APIs) for other applications to consume. In a general sense, the API is a set of rules and protocols that defines how two software systems may communicate with each other. AI APIs allow advanced AI capabilities of the AI engine to be integrated into applications by allowing the application to make requests to the API and to receive responses. Thus, these applications provide, through the API, data to the AI engine, which runs machine learning models on the data to give suitable results as requested by the applications. Different AI engines may use different machine learning models, thereby providing different results to the same input data. Some AI engines may provide a certain functionality (e.g., text processing only) and some other AI engines may provide a certain other functionality (e.g., image processing only), while some others may provide multiple functionalities (e.g., text, speech, and image processing).

An example arena where AI is being increasingly used is in website building. With the help of AI, AI-based website tools can automatically generate code, create content, and provide design recommendations based on user input. Examples of commercially available website builders using AI include Wix™, Jimdo™, Unbounce™, CodeWP™, Framer™. One such AI-based website tool uses inputs from users, such as selections of the kind of site desired, features needed, information about the user (e.g., name or title of the website, textual blurbs, etc.) and moods (e.g., themes). The website tool typically prompts the user to select a particular design from an array of design choices, and make further selections based on the features, themes and user information displayed. The user may have to add personalized content to the selected choices before being able to deploy the website publicly. Some other website tools may pull certain content like images and business information from third-party links, such as social media sites or Google Business™ listings. Yet other website tools offer standalone templates that are selected by the AI engine, and the user can configure the template appropriately, such as by editing page headers, uploading images, updating links, etc. In general, in most of these web building tools using AI, the human user must nevertheless select various features, upload content, configure personalized widgets such as scheduling assistants, and generally tweak the site design.

While many websites typically include static landing pages with graphics, text and links, some other types of websites may present user experience (UX) flows that require user interaction, and the data generated from the UX flows may be used by the website owner for future marketing purposes. Such websites are termed "funnels" or "funnel websites". In general, a funnel represents a series of UX steps a user takes from becoming aware of a product or service to becoming a paid customer, a process also called converting. In contrast to a static website where traffic arrives and travels randomly, for example, between pages, links, text, graphics, etc., on a funnel website, traffic flows linearly from a point of entry through a sequence of actions leading to a specific goal (such as becoming a paid customer, signing up for email subscriptions, scheduling a service appointment, etc.). While effective static websites may achieve customer conversion, funnel websites offer greater specificity in terms of their goals and target audience. The funnel website typically has several landing pages, each with text, graphics, and at least some pages in which the user can input information useful for marketing purposes. For example, a sales funnel website may have a "Homepage," an "About" page, a "Sign up/Login page," a "Pricing" page, a "Help/Support" page and a "Products" page with information about products configured in a manner to increase sales, such as by inducing a visitor to click on a "Buy Now" button and purchase a product from the website.

AI engines can assist in generating funnels from lead generation to lead nurturing to conversion, helping marketers improve their strategy and streamline their processes. Typical AI tools for funnel building generate forms (e.g., quizzes), capture email addresses, and send targeted emails automatically. Some AI tools can perform custom copywriting, insert product images and graphics and generate a professional page in much less time than it would take a human operator. Some AI engines leverage natural language processing (NLP) to generate effective sales copy and content with a simple prompt from the user, enabling personalized content for different customers. AI engines are also used to analyze data from websites and optimize sales funnels.

In theory, AI can optimize sales funnel websites by using past data. For example, the AI engine can pre-qualify prospects based on a visitor's past browsing behavior on the funnel website. In another example, the AI engine may automatically scour Internet forums and social media to identify if a visitor to the funnel website is shopping actively or merely window shopping. However, in practice, the effectiveness of AI models is only as good as the learning data they have access to. In standalone applications with website funnel building tools using AI that are offered to different businesses, the AI engine is separate from the business, which is the website owner. Therefore, it may not have access to the final outcome of the funnel website that it has built for the business, for example, the actual conversion rate of the funnel website. Thus, it may not be able to effectively optimize future funnels based on past experience. Even in instances where a website owner of a particular business has its own AI engine-based funnel website application, the AI engine has access only to the websites created for that business and may not be able to leverage any learning data from other funnel websites of different businesses.

In contrast, according to embodiments disclosed herein, a funnel website application in a tiered software framework may generate, using an AI engine, funnel websites for a particular subscriber of the tiered software framework. The funnel websites may be generated based on conversion rates for previously generated funnel websites associated with subscribers sharing one or more commonalities with the particular subscriber who has requested the funnel websites. For example, the commonality may be a business type (e.g., plumber, dentist, etc.); in another example, the commonality may be a business size (e.g., large, middling, small, etc.); in yet another example, the commonality may be business location (e.g., City A in State B, etc.). Any type of commonality may be included within the broad scope of the embodiments. This differs from currently available technologies, where either conversion rates are not available, or if they are, then they are limited by the business. In embodiments described herein, the tiered software framework includes conversion rates across many varieties of businesses, and the conversion rates and such other data useful to generate effective funnel websites are uniquely accessible according to a tiered hierarchy of the software framework.

In a particular embodiment, a prompt may be received at the tiered software framework, the prompt containing requirements for generating the funnel website. The tiered software framework may include data from accounts of a plurality of subscribers, and the requirements may be from one subscriber in the plurality of subscribers. An AI engine in the tiered software framework may perform a search for a plurality of funnel website templates based at least on the prompt. The AI engine may rank the plurality of funnel website templates returned in the search from the highest rank to the lowest rank. The ranking may be based on conversion rates for previously generated funnel websites associated with subscribers in the plurality of subscribers sharing at least one commonality with the one subscriber. The conversion rates may be automatically calculated in the tiered software framework from real-time monitoring of user feedback on the previously generated funnel websites and marketing channels integrated with the tiered software framework. The highest rank may be associated with a higher conversion rate than the lowest rank. The AI engine may select a funnel website template having the highest rank, retrieve business information of the one subscriber (i.e., the requestor), and fill the selected funnel website template with the business information to generate the funnel website. The funnel website may be deployed at one of a plurality of tiers of the tiered software framework.

In another embodiment, a first tier, a second tier and a third tier may be provided in a software framework. Data in the first tier may be accessible at the first tier and inaccessible at the second tier and the third tier, data in the second tier may be accessible at the first tier and the second tier and inaccessible at the third tier, and data in the third tier may be accessible at the first tier, the second tier and the third tier. An AI engine may be provided at the first tier. The AI engine may automatically generate funnel website templates based on previously generated funnel websites. The AI engine may further automatically build new funnel websites at the first tier for subscribers at the third tier using the generated funnel website templates. The new funnel websites may be automatically deployed at the third tier.

In the following detailed description, various aspects of the illustrative implementations may be described using terms commonly employed by those skilled in the art to convey the substance of their work to others skilled in the art.

The term "connected" means a direct connection (which may be one or more of a communication, mechanical, and/or electrical connection) between the things that are connected, without any intermediary devices, while the term "coupled" means either a direct connection between the things that are connected, or an indirect connection through one or more passive or active intermediary devices.

The term "computing device" means a server, a desktop computer, a laptop computer, a smartphone, or any device with a microprocessor, such as a central processing unit (CPU), general processing unit (GPU), or other such electronic component capable of executing processes of a software algorithm (such as a software program, code, application, macro, etc.).

The term "cloud network" means a network of computing devices coupled together in a public, private, or hybrid communications network. Communication in the cloud network may use one or more wired, wireless, broadband, radio, and other kinds of communicative means. The Internet is an example of a cloud network.

As used herein, the term "application" can be inclusive of an executable file comprising instructions that can be understood and processed on a computing device such as a computer, and may further include library modules loaded during execution, object files, system files, hardware logic, software logic, or any other executable modules. Applications are generally configured to perform particular tasks, or functions according to the type of application.

The description uses the phrases "in an embodiment" or "in embodiments," which may each refer to one or more of the same or different embodiments.

Although certain elements may be referred to in the singular herein, such elements may include multiple sub-elements. For example, "a computing device" may include one or more computing devices.

Unless otherwise specified, the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

In the following detailed description, reference is made to the accompanying drawings that form a part hereof, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense.

The accompanying drawings are not necessarily drawn to scale. In the drawings, same reference numerals refer to the same or analogous elements shown so that, unless stated otherwise, explanations of an element with a given reference numeral provided in context of one of the drawings are applicable to other drawings where element with the same reference numerals may be illustrated. Further, the singular and plural forms of the labels may be used with reference numerals to denote a single one and multiple ones respectively of the same or analogous type, species, or class of element.

Note that in the figures, various components are shown as aligned, adjacent, or physically proximate merely for ease of illustration; in actuality, some or all of them may be spatially distant from each other. In addition, there may be other components, such as routers, switches, antennas, communication devices, etc. in the networks disclosed that are not shown in the figures to prevent cluttering. Systems and networks described herein may include, in addition to the elements described, other components and services, including network management and access software, connectivity services, routing services, firewall services, load balancing services, content delivery networks, virtual private networks, etc. Further, the figures are intended to show relative arrangements of the components within their systems, and, in general, such systems may include other components that are not illustrated (e.g., various electronic components related to communications functionality, electrical connectivity, etc.).

In the drawings, a particular number and arrangement of structures and components are presented for illustrative purposes and any desired number or arrangement of such structures and components may be present in various embodiments. Further, unless otherwise specified, the structures shown in the figures may take any suitable form or shape according to various design considerations, manufacturing processes, and other criteria beyond the scope of the present disclosure.

For convenience, if a collection of drawings designated with different letters are present (e.g., FIGS. 11A-11G), such a collection may be referred to herein without the letters (e.g., as "FIG. 11"). Similarly, if a collection of reference numerals designated with different letters are present (e.g., 106a, 106b), such a collection may be referred to herein without the letters (e.g., as "106") and individual ones in the collection may be referred to herein with the letters. Further, labels in upper case in the figures (e.g., 106A) may be written using lower case in the description herein (e.g., 106*a*) and should be construed as referring to the same elements.

Various operations may be described as multiple discrete actions or operations in turn in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

Example Embodiments

FIG. 1 is a simplified block diagram illustrating an example funnel website application 100 according to embodiments of the present disclosure. Funnel website application 100 may comprise various tiers 102. In the example embodiment shown, funnel website application 100 has three tiers: 102-1, 102-2, and 102-3. Note that the labeling convention followed herein uses the hyphen followed by a number to denote a separate tier corresponding to the number (e.g., "-1" denotes tier-1, "-2" denotes tier-2, and "-3" denotes tier-3). Funnel website application 100 may be managed by a software-as-a-service (SaaS) provider 104, who may provide one or more downstream subscribers 106-2 at tier 102-2 with access to funnel website application 100. In turn, subscriber 106-2 may provide one or more downstream subscriber 106-3 at tier 102-3 with access to funnel website application 100. SaaS provider 104 and subscribers 106 (e.g., 106-2 and 106-2) may include an entity (i.e., a company, an organization, etc.) in various embodiments. Human users at SaaS provider 104, and subscribers 106 may operate or otherwise use funnel website application 100 through one or more devices such as computers, laptops, smartphones, mobile computing devices, mobile phones, iPads™, Google Droids™, Microsoft® Surface™, etc. In various embodiments, a single one of SaaS provider 104 may have multiple subscribers 106-2 at tier 102-2; a single one of subscriber 106-2 at tier 102-2 may have multiple subscribers 106-3 at tier 102-3. Subscribers 106-2 may have accounts with SaaS provider 104 at tier 102-1; subscribers 106-3 may have accounts with subscribers 106-2 at tier 102-2.

Funnel website application 100 may include an AI engine 110, a template library 112, data 114, a split testing tool 116, a real-time monitoring engine 118, and a user interface 120. AI engine 110 may include a prompt generator 122 for generating prompts from user-entered data, a semantic search tool 124 for performing a semantic search using the prompt (either entered by a user or generated by prompt generator 122), a template selection tool 126 for generating one or more templates from template library 112, a forms generator 128 for generating forms for the funnel websites, and a stitching tool 130 to generate the funnel websites by stitching together various elements from various templates and third-party graphics 132.

Template library 112 may comprise a plurality of page templates 134, another plurality of funnel templates 136, and yet another plurality of form templates 138. Each page template 134 may comprise a unique arrangement of graphics, text and/or forms different from other page templates 134 in template library 112. In some embodiments, page templates 134 may be generated by AI engine 110; in other embodiments, page templates 134 may be derived from previously generated funnel websites; in yet other embodiments, page templates 134 may be purchased or downloaded from third parties. Example of elements in page template 134 includes buttons, call to actions (CTA) (e.g., buttons or other selection tools for actions such as "purchase," "read more," "submit," etc.), graphics, and typography. Each funnel template 136 may comprise a unique user experience (UX) flow different from other funnel templates 136 in template library 112. In some embodiments, funnel templates 136 may be generated by AI engine 110; in other embodiments, funnel templates 136 may be derived from previously generated funnel websites; in yet other embodiments, funnel templates 136 may be purchased or downloaded from third parties. Each form template 138 may comprise a unique arrangement of form fields different from other form templates 138 in template library 112. In some embodiments, form templates 138 may be generated by AI engine 110; in other embodiments, form templates 138 may be derived from previously generated funnel websites; in yet other embodiments, form templates 138 may be purchased or downloaded from third parties. Elements from page templates 134, funnel templates 136 and form templates may be combined into one or more funnel website templates 140.

Data 114 may include data from SaaS provider 104 and plurality of subscribers 106. In various embodiments, data 114 may include business information of SaaS provider 104 and plurality of subscribers 106. As used herein, "business information" includes business name, business category, business address and contact information, business location, business market niche, business size, business revenue, business marketing processes, business social media accounts, product/service descriptions, store timings, customer demographics, customer preferences, customer behavior, business trends, customer trends, and such other information that is useful and relevant for generating funnel websites. In an example embodiment, subscribers 106-2 may comprise marketing agencies, and subscribers 106-3 may comprise individual businesses, such as plumbers, dentists, pet stores, etc. Data 114 may comprise the business information of the marketing agencies and the individual businesses.

Split testing tool 116 may store a plurality of ranked funnel website templates 140 for split testing. As the name implies, each one in the plurality of ranked funnel website templates 140 may comprise funnel website templates 140 ranked according to various criteria, including conversion rates. Split testing tool 116 may perform split testing with two or more selections from ranked funnel website templates 140, the selections being based on their respective ranks. A comparator 142 may compare user feedback among various funnel websites being tested.

User interface 120 may comprise different menus 144 for different tiers 102. For example, a tier-1 menu 144-1 may present user interface elements with functionalities available to SaaS provider 104 (e.g., access and view of data across all tiers 102-1, 102-2 and 102-3); another tier-2 menu 144-2 may present user interface elements with functionalities available to subscribers 106-2; yet another tier-3 menu 144-3 may present user interface elements with functionalities available to subscribers 106-3.

Funnel website application 100 may generate one or more funnel website 150. Funnel website 150 may comprise at least a page 152 and a UX flow 154. Each page 152 may comprise content 156, including selections from text 158, graphics 160 (including static images, moving GIFs and videos), and forms 162.

Real-time monitoring engine 118 may monitor funnel website 150 for user feedback 166 from a user 168 visiting funnel website 150 and/or other marketing channels 170. Marketing channels 170 may include, by way of examples, and not as limitations, email campaigns, short message service (SMS) texts, Voice over Internet Protocol (VOIP) calls, social media accounts, and digital advertisements. User feedback 166 may include, without limitation, clicks 172, views 174, data input 176, and hovers 178. User feedback 166 may also include conversion data 180 and bounce data 182. Conversion data 180 captures information about user 168's status as having completed one or more UX flow 154, turning from a mere viewing visitor to a customer (e.g., paying customer, email subscriber, form submitter, etc.). Bounce data 182 is the opposite of conversion data 180, capturing information about user 168's status from a visitor to a "leaver" who has left the website without following any one or more UX flow 154. Each conversion data 180 is captured as an addition to the conversion rate of funnel website 150; each bounce data 182 is captured as an addition to the bounce rate of funnel website 150. In various embodiments, user feedback 166 may be added into data 114.

In various embodiments, funnel website application 100 may be provisioned in tier 102-1, and funnel website 150 may be deployed at tier 102-3. Funnel website application 100 may include a deploy module 184 that deploys (e.g., publishes) funnel website 150 at tier 102-3. Deploying or publishing funnel website 150 comprises making funnel website 150 accessible and viewable to users 168. The process may involve putting appropriate website files and content onto a web server with appropriate access credentials. The process may also include registering a domain name, obtaining a web hosting service, configuring domain name system (DNS) settings to point the domain name to the web hosting server, implementing SSL certificates, enabling secure connections, and other tasks that enable content 156 to be accessible to and interactable with users 168. By deploying funnel website 150 at tier 102-3, user feedback 166 collected from funnel website 150 may be separated from similar data of other subscribers 106.

During operation, a prompt with requirements for generating funnel website 150 may be received at AI engine 110. The requirements may be received from (or otherwise associated with) a particular one of subscribers 106, for example, subscriber 106-3a. Note that although a subscriber in tier 102-3 is chosen as an example, any subscriber 106 or even SaaS provider 104 may provide the requirements to build funnel website 150 within the broad scope of the embodiments herein. In some embodiments, the prompt may be generated by prompt generator 122 based on information provided by subscriber 106-3a.

Semantic search tool 124 in AI engine 110 may use various semantic models to interpret the received prompt and perform a semantic search against template library 112 for a plurality of funnel website templates 140 based at least on the prompt. In some embodiments, content 156 may be generated for funnel website 150 based on the prompt, and the search for the plurality of funnel website templates 140 may be performed based on the generated content. In various embodiments, selections from page templates 134, funnel templates 136, and form templates 138 may be stitched together by stitching tool 130 to generate the plurality of funnel website templates 140. Template selection tool 126 may rank the plurality of funnel website templates 140 returned in the search from the highest rank to the lowest rank.

In various embodiments, the ranking may be based on the conversion rates for previously generated funnel websites 150 associated with subscribers 106 that share at least one commonality with subscriber 106-3a. For example, subscriber 106-3a may be a plumber located in City A catering primarily to homeowners. Template selection tool 126 may analyze conversion rates for previously generated funnel websites associated with plumbers in one example. In another example, template selection tool 126 may analyze conversion rates for previously generated funnel websites associated with businesses (not necessarily plumbers) in City A. In yet another example, template selection tool 126 may analyze conversion rates for previously generated funnel websites associated with businesses (not necessarily plumbers) that cater to homeowners. In yet another example, template selection tool 126 may analyze conversion rates for previously generated funnel websites associated with plumbers in City A catering to homeowners. Various other such analysis choices may be included within the broad scope of the embodiments herein.

In some embodiments, the conversion rates are automatically calculated from real-time monitoring of user feedback 166 on previously generated funnel websites and marketing channels 170, such information being included with data 114. The highest rank may be associated with a higher conversion rate than the lowest rank. In various embodiments, the ranking may be targeted to meet the requirements. For example, the requirements may specify that visitors should sign up for email updates. The ranking may target email subscription rates of the various previously generated funnel websites, calculating the conversion rate as the number of email subscribers per funnel website template 140. In another example, the requirements may specify that visitors should purchase at least one item on the funnel website. The ranking in this case may target shopping rates from the various previously generated funnel websites, calculating the conversion rate as the number of shoppers that bought at least one item from the funnel website. Template selection tool 126 may select a funnel website template 140 having the highest rank, retrieve business information of subscriber 106-3a, and fill the selected funnel website template 140 with the business information to generate funnel website 150. Deploy module 184 in funnel website application 100 may deploy funnel website 150 at one of a plurality of tiers 102, for example, tier 102-3.

In various embodiments, forms generator 128 in AI engine 110 may generate one or more forms for funnel website 150. Generating the form may comprise selecting a category of the form (e.g., email form for entering email address; contact form for entering general contact information; review form for entering comments; etc.) based on the business information of subscriber 106-3a, identifying form fields in the selected category of the form, correlating the identified form fields to user feedback 166, selecting a subset of the identified form fields having higher positive user feedback 166 than other unselected form fields and stitching the selected form fields together. For example, not all visitors to a funnel website may feel comfortable sharing their cell phone information, whereas they may easily share their email address. In another example, a particular demographic may not typically have an email address, instead using texts on social media sites such as WhatsApp™, so the form may have higher positive user feedback 166 (e.g., higher conversion rate) with a mobile number field rather than an email field. Various other such choices may be included within the broad scope of the embodiments.

In various embodiments, split testing tool 116 may perform split testing of generated funnel website 150. In some embodiments, funnel website templates 140 ranked by template selection tool 126 may be collected into ranked funnel website templates 140. Assume that the generated funnel website 150 is a first funnel website 150a generated using a first funnel website template 140a having a first rank (e.g., the highest rank in the first iteration). First funnel website 150a may be deployed on a first group of users and real-time user feedback 166 therefrom as captured by real-time monitoring engine 118 may indicate a first conversion rate. A second funnel website 150b may be automatically generated from a second funnel website template 140b selected from ranked funnel website templates 140 as having a second rank immediately succeeding the first rank. Second funnel website 150b may be automatically deployed on a second group of users and user feedback 166 therefrom as captured by real-time monitoring engine 118 may indicate a second conversion rate. Comparator 142 may compare the first conversion rate and the second conversion rate. Responsive to determining that the first conversion rate is less than the second conversion rate, the first funnel website 150a may be replaced with the second funnel website 150b. The split testing may be repeated automatically with funnel website templates 140 of successively lower ranks until the second conversion rate is less than the first conversion rate. In some cases, the split testing may stop after the first iteration because no other funnel website template 140 performs as well as the first funnel website template 140a; in other cases, the split testing may continue for several iterations. Because the iterations are based on real-time user feedback 166, the final design of funnel website 150 selected after split testing as in the various embodiments described herein may be more effective than with other selection processes.

FIG. 2 is a simplified block diagram illustrating a tiered software framework 200 according to various embodiments. In example implementations, at least some portions of the activities outlined herein may be hosted on a cloud network 202 in one or more servers 204. At least some other portions of the activities outlined herein may be implemented in one or more computing devices 206 connected over one or more communication networks with cloud network 202. In particular embodiments, cloud network 202 is a collection of hardware devices and executable software forming a shared pool of configurable computing resources (e.g., networks, servers, storage, applications, services, etc.) that may be suitably provisioned to provide on-demand self-service, network access, resource pooling, elasticity and measured service, among other features. Computing device 206 may have any desired form factor, such as a handheld or mobile computing device (e.g., a cell phone, a smart phone, a mobile Internet device, a tablet computer, a laptop computer, a netbook computer, an ultra-book computer, a Personal Digital Assistant (PDA), an ultramobile personal computer, etc.), a desktop computing device, a server or other networked computing component, a set-top box, an entertainment control unit, or a wearable computing device.

Certain portions of tiered software framework 200 (e.g., funnel website application 100) may execute using a processing circuitry 208, a memory 210 and communication circuitry 212 (among other components) in one or more servers 204. Certain other portions of tiered software framework 200 may execute in one or more computing devices 206 using respective processing circuitry, memory, and communication circuitry (not shown with particularity so as not to clutter the drawing) substantially similar in functionalities to processing circuitry 208, memory 210 and communication circuitry 212. In some embodiments, one or more of these features may be implemented in hardware, provided external to these elements, or consolidated in any appropriate manner to achieve the intended functionality. The various network elements in tiered software framework 200 may include communication software that can coordinate to achieve the operations as outlined herein. In still other embodiments, these elements may include any suitable algorithms, hardware, software, components, modules, interfaces, or objects that facilitate the operations thereof.

Processing circuitry 208 may execute any type of instructions associated with data stored in memory 210 to achieve the operations detailed herein. In one example, processing circuitry 208 may transform data from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., field programmable gate array (FPGA), an erasable programmable read only memory (EPROM), an application specific integrated circuit (ASIC)) that includes digital logic, software, code, electronic instructions, flash memory, optical disks, magnetic or optical cards, other types of machine-readable mediums suitable for storing electronic instructions, or any suitable combination thereof.

In some of example embodiments, one or more memory 210 may store data used for the operations described herein. This includes memory 210 storing instructions (e.g., software, logic, code, etc.) in non-transitory media (e.g., random access memory (RAM), read only memory (ROM), FPGA, EPROM, etc.) such that the instructions are executed to carry out the activities described in this disclosure based on particular needs. In some embodiments, memory 210 may comprise non-transitory computer-readable media, including one or more memory devices such as volatile memory such as dynamic RAM (DRAM), nonvolatile memory (e.g., ROM), flash memory, solid-state memory, and/or a hard drive. In some embodiments, memory 210 may share a die with processing circuitry 208. Memory 210 may include algorithms, code, software modules, and applications, which may be executed by processing circuitry 208. The data being tracked, sent, received, or stored in tiered software framework 200 may be provided in any database, register, table, cache, queue, control list, or storage structure, based on particular needs and implementations, all of which could be referenced in any suitable timeframe.

Communication circuitry 212 may be configured for managing wired or wireless communications for the transfer of data in tiered software framework 200. The term "wireless" and its derivatives may be used to describe circuits, devices, systems, methods, techniques, communications channels, etc., that may communicate data through modulated electromagnetic radiation in a nonsolid medium. The term does not imply that the associated devices do not contain any wires, although in some embodiments they might not. Communication circuitry 212 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long Term Evolution (LTE) project along with any amendments, updates, and/or revisions (e.g., advanced LTE project, ultramobile broadband (UMB) project (also referred to as "3GPP2"), etc.). Communication circuitry 212 may operate in accordance with a Global System for Mobile Communication (GSM), General Packet Radio Service (GPRS), Universal Mobile Telecommunications System (UMTS), High-Speed Packet Access (HSPA), Evolved HSPA (E-HSPA), or LTE network. Communication circuitry 212 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). Communication circuitry 212 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. Communication circuitry 212 may operate in accordance with other wireless protocols in other embodiments. Communication circuitry 212 may include antennas to facilitate wireless communications and/or to receive other wireless communications.

In some embodiments, communication circuitry 212 may manage wired communications, such as electrical, optical, or any other suitable communication protocols (e.g., the Ethernet, Internet). Communication circuitry 212 may include multiple communication chips. For instance, a first communication chip may be dedicated to shorter-range wireless communications such as Wi-Fi or Bluetooth, and a second communication chip may be dedicated to longer-range wireless communications such as global positioning system (GPS), EDGE, GPRS, CDMA, WiMAX, LTE, EV-DO, or others. In some embodiments, a first communication chip may be dedicated to wireless communications, and a second communication chip may be dedicated to wired communications.

The example network environment may be configured over a physical infrastructure that may include one or more networks and, further, may be configured in any form including, but not limited to, local area networks (LANs), wireless local area networks (WLANs), virtual local area networks (VLANs), metropolitan area networks (MANs), wide area networks (WANs), virtual private networks (VPNs), Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a WANs (e.g., the Internet).

Funnel website application 100 may be implemented in tiered software framework 200 comprising at least three tiers 102: tier-1 (102-1), tier-2 (102-2), and tier-3 (102-3). Tiers 102 may be organized according to a hierarchy of management (i.e., to oversee, to control, to maintain), with upstream tiers managing downstream ones. Thus, tier 102-1 comprises operations that may manage tiers 102-2 and 102-3, whereas tier 102-2 comprises operations that may manage tier 102-3 but not tier 102-1. For purposes of terminology, tier 102-1 is "upstream" relative to tiers 102-2 and 102-3; tier 102-3 is "downstream" relative to tiers 102-2 and 102-1; tier 102-2 is downstream relative to tier 102-1 and upstream relative to tier 102-3. In some embodiments, each tier 102 may interact with the tier immediately adjacent thereto (e.g., downstream or upstream) but not with non-adjacent tiers. In some other embodiments, any tier 102 may interact with any other tier. In an example embodiment, tier 102-3 comprises marketing activities by business locations such as a dentist's office, a plumber's business, etc.; tier 102-2 comprises software operations by one or marketing agencies whose customers are the business locations of tier 102-3; and tier 101-1 comprises software operations by SaaS provider 104 whose customers are the marketing agencies of tier 102-2.

In various embodiments, tiers 102 may be partitioned into a backend 214 and a frontend 216. Backend 214 may comprise tier-1 backend 214-1, tier-2 backend 214-2, and tier-3 backend 214-3 provisioned in one or more servers 204. Likewise, frontend 216 may comprise tier-1 frontend 216-1, tier-2 frontend 216-2, and tier-3 frontend 216-3 provisioned in one or more computing devices 206. Backend 214 may comprise various modules, logic, software engines and other components that are distributed (and common) across all users of tiered software framework 200. Backend 214 may execute operations for managing and processing data, performing computations, and facilitating communication between different components, such as components of funnel website application 100. In particular embodiments, backend 214 may include operations such as data management, business logic (e.g., funnel website application 100), user authentication and authorization, security and validation, application programming interfaces (APIs) with third-party components such as payment processors, etc.

In a general sense, frontend 216 comprises at least user interface 120 using which users interact with tiered software framework 200. Frontend 216 may also include libraries, forms, device integrators and other components as desired and based on particular needs. Frontend 216 may be presented on a suitable display device coupled to computing device 206 and appropriate to show visual indicators, such as a heads-up display, a computer monitor, a projector, a touchscreen display, a liquid crystal display (LCD), a light-emitting diode display, and/or a flat panel display. In various embodiments, frontend 216 may be specific to the particular one of tier 102. For example, frontend 216-1 at tier-1 may comprise certain functionalities available (and visible) only to SaaS provider 104. Frontend 216-2 at tier-2 may comprise certain functionalities available (and visible) only to tier-2 subscriber 106-2. Frontend 216-3 at tier-3 may comprise certain functionalities available (and visible) only to tier-3 subscriber 106-3.

Tiered software framework 200 described and shown herein (and/or its associated structures) may also include suitable interfaces for receiving, transmitting, and/or otherwise communicating data or information in a network environment. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

Figure 3:
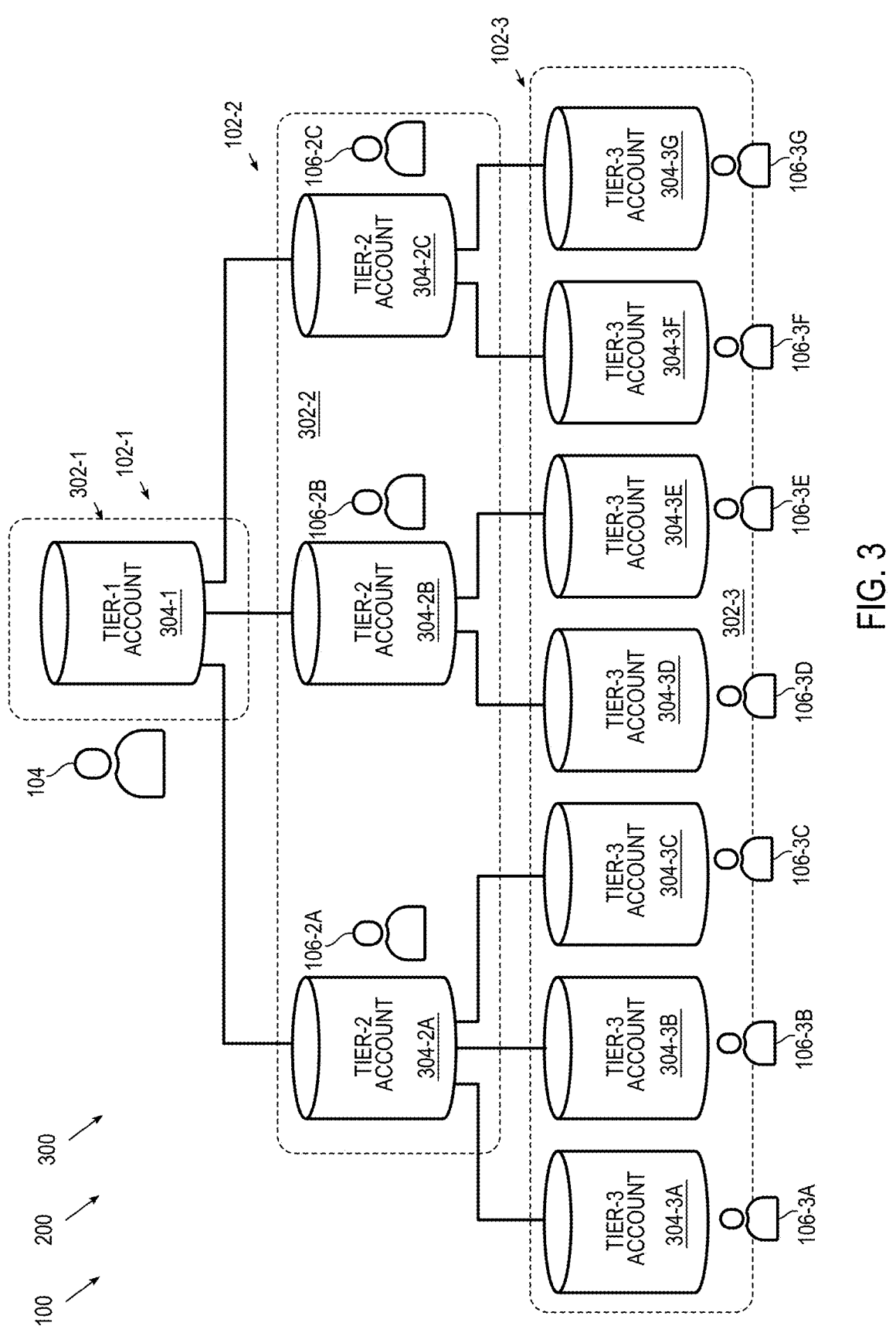
FIG. 3 is a simplified block diagram illustrating other example details of the tiered software framework implementing the systems and methods for building funnel websites using AI, according to some embodiments of the present disclosure.

FIG. 3 is a simplified block diagram illustrating example details of data hierarchy 300 of tiered software framework 200 implementing funnel website application 100, according to some embodiments of the present disclosure. In various embodiments, data 302 communicated in tiered software framework 200 may be exclusively received from users such as SaaS provider 104 and subscribers 106-2, and 106-3; in some other embodiments, data 302 may also be received from other sources, such as third parties and/or from the Internet. Examples of data 302 include business niche targeted by subscribers 106, marketing activities such as on social media, target audience of subscribers 106, login credentials to access various marketing platforms, frequency of marketing activities, information to be included in the content of marketing posts, customer lists, business locations, marketing platform rules, and other such data relevant to the functionalities offered by tiered software framework 200. Data 302 may be stored in data lakes, databases, data warehouses, blockchains, file systems and other types of data storage facilities within the broad scope of the embodiments with corresponding accessing and viewing capabilities as described herein. In various embodiments, data 114 may be a subset of data 302.

Data 302 in each tier 102 may be contained within accounts 304 accessible and viewable with appropriate access credentials. For example, account 304-1 may be associated with SaaS provider 104. Account 304-1 may manage a plurality of accounts 304-2 at tier 102-2. Subscriber 106-2a may have a subscription to account 304-2a in plurality of accounts 304-2. Account 304-2a may manage a plurality of accounts 304-3 at tier 102-3. Subscriber 106-3a may have a subscription to account 304-3a in plurality of accounts 304-3; subscriber 106-3b may have a subscription to account 304-3b in plurality of accounts 304-3; and subscriber 106-3c may have a subscription to account 304-3c in plurality of accounts 304-3. In other words, subscriber 106-2a has three downstream subscribers at tier 102-3, namely subscribers 106-3a, 106-3b, and 106-3c with their associated respective accounts 304-3a, 304-3b, and 304-3c. Likewise for other accounts shown in the figure. Note that such a framework is merely provided for illustrative purposes and should not be construed as a limitation. Any number of subscribers may be provided at tiers 102-2 and 102-3 in tiered software framework 200 within the broad scope of the embodiments. Note also that the labeling convention followed herein uses letters to denote a separate instance of the same component (e.g., "a" denotes instance A, "b" denotes instance B, and so on).

In various embodiments, data 302 may be arranged in data hierarchy 300 for different accounts 304 such that certain users can view and access only a subset of data 302 according to their respective tier 102 and access credentials based on particular needs (e.g., user credentials may indicate which tier 102 and which corresponding accounts 304 are available for access and view). Such accounts 304 may be facilitated by a suitable user interface at frontend 216 for viewing the accessible data. Appropriate user authentication and authorization engines running in backend 214 may ensure that accounts 304 are maintained as desired and appropriate privacy blocks are applied at appropriate tiers 102.

In the example illustrated herein, tier-1 data 302-1 may be of account 304-1; tier-2 data 302-2 may be of accounts 304-2a, 304-2b and 304-2c corresponding to subscribers 106-2a, 106-2b and 106-2c, respectively; tier-3 data 302-3 may be of accounts 304-3a . . . 304-3g corresponding to subscribers 106-3a . . . 106-3g. Subscribers 106-3a . . . 106-3g may access and view their own respective accounts 304-3a . . . 304-3g; however, they cannot access or view other accounts 304 in the same tier 102-3 or in upstream tiers 102-2 or 102-1. Note that accessing and viewing an account refers to accessing and viewing the data of the account.

Subscribers 106-2a . . . 106-2c at tier 102-3 may access and view their own respective accounts 304-2a . . . 304-2c as well as downstream accounts 304-3 of their respective subscribers 106-3; however, they cannot access or view other accounts 304-2 in the same tier 102-2, or in downstream tier 102-3 not associated with their downstream subscribers 106-3, or in upstream tier 102-1. For example, subscriber 106-2a may access and view accounts 304-2a, 304-3a, 304-3b, and 304-3c; subscriber 106-2b may access and view accounts 304-2b, 304-3d, and 304-3e; subscriber 106-2c may access and view accounts 304-2c, 304-3f, and 304-3g. SaaS provider 104 at tier 102-1 may access and view accounts 304-1 at tier 102-1, 304-2a . . . 304-2c at tier 102-2, and 304-3a . . . 304-3g at tier 102-3.

Figure 4:
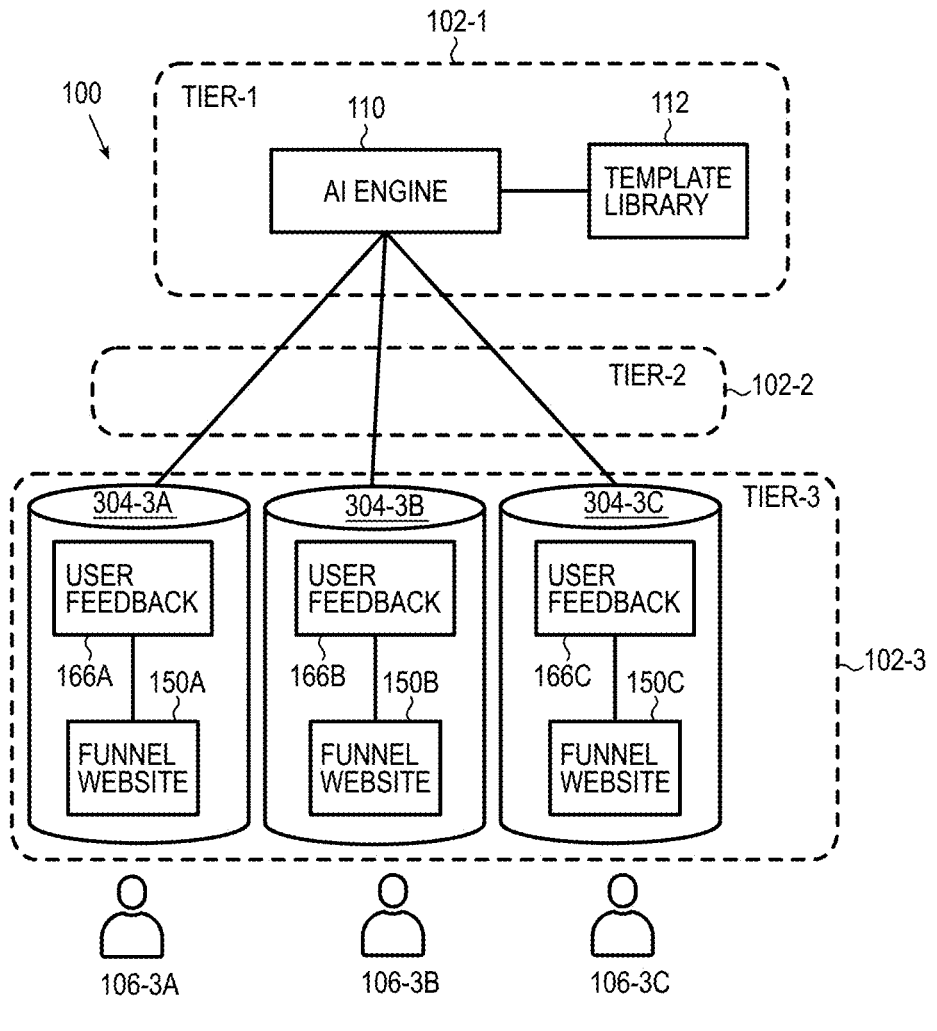
FIG. 4 is a simplified block diagram illustrating example details of the funnel website application, according to some embodiments of the present disclosure.

FIG. 4 is a simplified block diagram illustrating example details of funnel website application 100, according to some embodiments of the present disclosure. AI engine 110 may operate at tier 102-1. Template library 112 may also be stored at tier 102-1. Funnel website 150 may be deployed at tier 102-3. Thus, different subscribers 106-3 at tier 102-3 may be associated with different funnel websites 150. In the figure, three example funnel websites 150a, 150b and 150c are shown as associated with respective tier-3 subscribers 106-3a, 106-3b and 106-3c. Any number of funnel websites 150 may be deployed at tier 102-3 within the broad scope of the embodiments. User feedback 166 from each funnel website 150 may also be associated with accounts 304 of respective subscriber 106. For example, user feedback 166a may be associated with account 304-3a of subscriber 106-3a; user feedback 166b may be associated with account 304-3b of subscriber 106-3b; user feedback 166c may be associated with account 304-3c of subscriber 106-3c. Tier 102-2 may be pass-through, facilitating data sharing between tiers 102-1 and 102-3.

AI engine 110 may access all accounts 304 at tier 102-3 and has access to user feedback 166 across all accounts 304-3. Thus, even though user feedback 166a is insulated and separate from user feedback 166b relative to subscribers 106-3a and 106-3b, they are equally accessible to AI engine 110. AI engine 110 may use user feedback 166a . . . 166c across plurality of accounts 304a . . . 304c to analyze conversion rates and generate funnel websites 150 accordingly. Thus, embodiments of the present disclosure may permit automatic generation of funnel websites 150 using AI engine 110 using substantially all user feedback 166 available thereto while maintaining confidentiality of such user feedback 166 among individual subscribers 106. For example, while subscriber 106-3a may have access to user feedback 166a, user feedback 166b or 166c is not available to subscriber 106-3a. Thus, embodiments of funnel website application 100 may differ from funnel website applications of a single business by accessing user feedback 166 of any business subscribed to tiered software framework 200. Further, funnel website application 100 may have access to business information of individual subscribers 106 that enable it to tailor funnel websites 150 to those subscribers 106 with more specificity than is available for generic funnel website applications.

For example, generic funnel website applications may ask certain questions of its users and build funnel websites based on the information provided. In some such cases, the users may not know to what specificity they must provide information, or what sort of information can lead to better conversion rates. On the other hand, funnel website application 100 has access to not only user feedback 166 of substantially all subscribers 106, it also has access to business information and other such information stored as data 114. AI engine 110 may analyze data 114 without additional human input to determine the specific information pertaining to specific subscriber 106-3a that has the highest chance of conversion. The specific information may differ for different subscribers 106-3a . . . 106-3c, so that funnel websites 150a . . . 150c have different looks and feels tailored for their respective end users.

Figure 5:
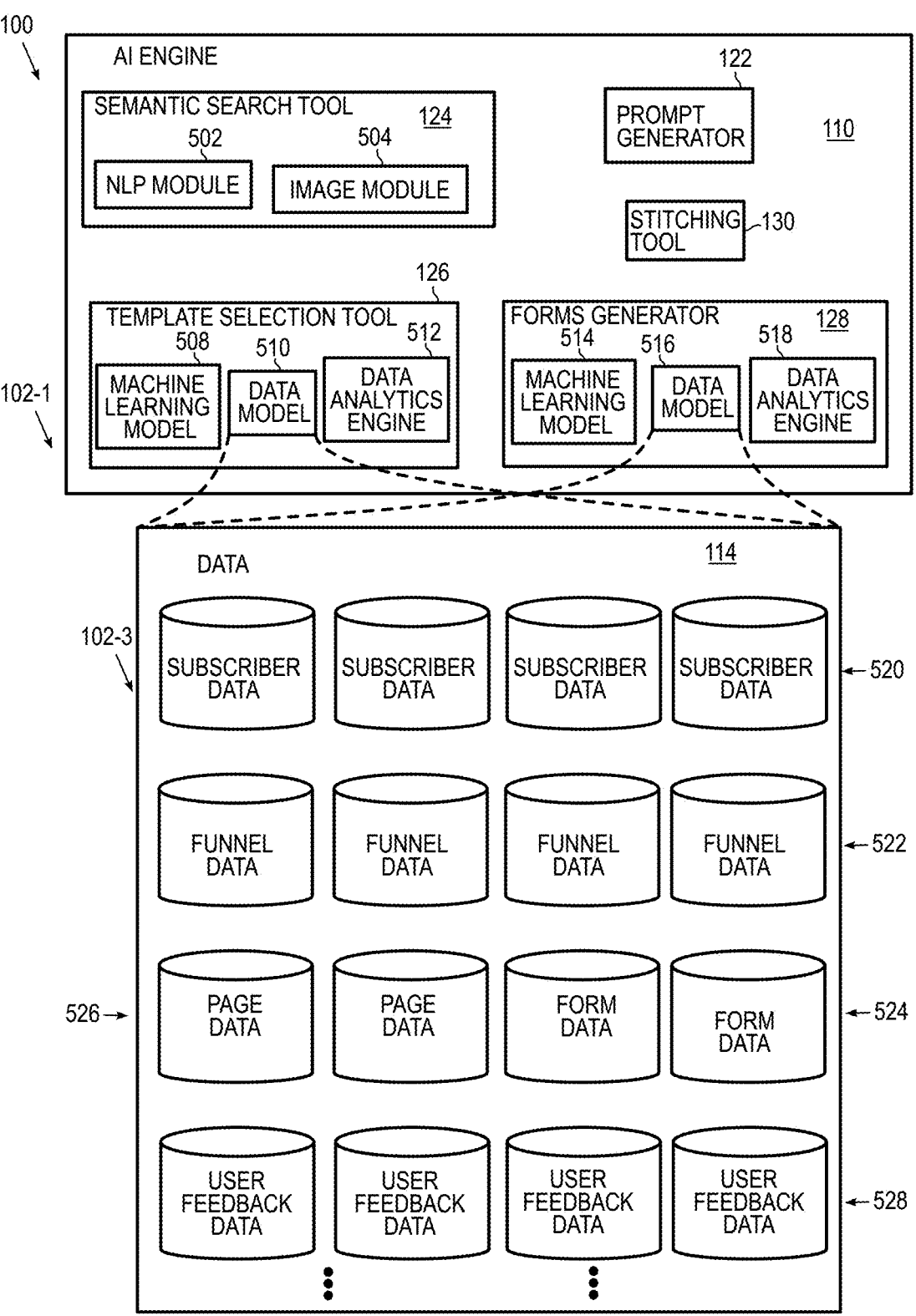
FIG. 5 is a simplified block diagram illustrating other example details of the funnel website application, according to some embodiments of the present disclosure.

FIG. 5 is a simplified block diagram illustrating example details of funnel website application 100, according to some embodiments of the present disclosure. AI engine 110 may include prompt generator 122, semantic search tool 124, template selection tool 126 for generating one or more templates from template library 112, forms generator 128, and stitching tool 130. Semantic search tool 124 may include a NLP module 502, and an image module 504. NLP module 502 comprises a software component to parse, understand, and interpret human language text or speech in the prompt that comprises requirements for funnel website 150. NLP module 502 may perform a variety of tasks, including but not limited to: text classification and sentiment analysis for understanding the tone or theme conveyed in the requirements, named entity recognition for identifying and classifying names of people, organizations, locations, dates, etc. within the prompt, and language modeling, to predict the likelihood of a sequence of words in the prompt. In some embodiments, NLP module 502 may be integrated into funnel website application 100; in other embodiments, NLP module 502 may have suitable application programming interfaces (APIs) to communicate with third-party AI engines operating outsider tiered software framework 200 such as NLTK™, spaCy™, Hugging Face Transformers™, and Google TensorFlow™.

Image module 504 may comprise an image synthesis tool with native algorithms or APIs interfacing with external AI engines to select images appropriate for funnel website 150 based on the prompt and/or requirements therein. In some embodiments, image module 504 may analyze the prompt for requirements about graphics 160 appropriate for funnel website 150. In some embodiments, based on the textual prompt, image module 504 may search third-party sources or generate images by utilizing the learned relationships between text and images in its training data. In some embodiments, image module 504 may be integrated into funnel website application 100; in other embodiments, image module 504 may have suitable APIs to communicate with third-party AI engines operating outsider tiered software framework 200 such as DALL-E™.

Template selection tool 126 may comprise one or more machine learning model 508, data model 510 and data analytics engine 512. In various embodiments, machine learning model 508 may include any suitable mathematical model consisting of parameters that are learned from data 114. Examples of machine learning model 508 include regression models, classification models, clustering models, neural networks, generative models, etc. Any suitable machine learning model appropriate for selecting funnel website templates 140 using data 114 may be used in machine learning model 508 within the broad scope of the embodiments. Data model 510 includes a specific selection and arrangement of data 114 relevant for selecting funnel website templates 140. Data analytics engine 512 may include various algorithms and other software components to analyze data model 510 using machine learning model 508 for purposes of selecting appropriate funnel website templates 140 for funnel website 150.

Likewise, forms generator 128 may comprise one or more machine learning model 514, data model 516 and data analytics engine 518. In various embodiments, machine learning model 514 may include any suitable mathematical model consisting of parameters that are learned from data 114. Examples of machine learning model 514 include regression models, classification models, clustering models, neural networks, generative models, etc. Any suitable machine learning model appropriate for selecting form fields from data 114 may be used in machine learning model 514 within the broad scope of the embodiments. Data model 516 includes a specific selection and arrangement of data 114 relevant for selecting form fields. Although data models 510 and 516 use common data 114, they may differ in the type of model, or the subset of information used for analysis. Data analytics engine 518 may include various algorithms and other software components to analyze data model 516 using machine learning model 514 for purposes of selecting appropriate form fields for various forms in funnel website 150.

In various embodiments, data analytics engine 518 may select a category of the form applicable to funnel website 150 based on the business information of requesting subscriber 106-3a. For example, the category may be a contact form; another category may be a preference form; yet another category may be an appointment scheduling form; and so on. Selecting the category may include identifying subscribers 106 sharing at least one commonality with the requesting subscriber 106-3 by comparing the business information of requesting subscriber 106-3a with data 114 of other subscribers 106. Data analytics engine 518 may determine the frequency of form categories in previously generated funnel websites 150 associated with the identified subscribers 106 and choose the category with highest frequency that meets greatest number of requirements of funnel website 150. Forms generator 128 may identify form fields in the selected category of the form, correlate the identified form fields to user feedback 166, select a subset of the identified form fields having higher positive user feedback than other unselected form fields. Stitching tool 130 may stitch the selected form fields together to generate the form.

In various embodiments, data 114 may comprise a subset of data 302 communicated in tiered software framework 200 and arranged according to data hierarchy 300. Data 114 may include, without limitation, subscriber data 520, funnel data 522, form data 524, page data 526 and user feedback data 528. Subscriber data 520 may include business type, market niche, name, location, etc. Funnel data 522 may include various UX flows 154 used in previously generated funnel websites 150 and may include the structure of the UX flows, order of pages 152, various elements such as buttons, fillable fields, etc. used in the UX flows, etc. Form data 524 may include various forms used in previously generated funnel websites 150 and may include form fields, frequency of fields, types of forms, forms associated with certain themes, color choices, etc. Page data 526 may include various pages 152 used in previously generated funnel websites 150 and may include page structure, number of images, types of content 156, etc. User feedback data 528 may include user feedback 166 from previously generated funnel websites 150 and may include, as an example, conversion rate of users.

Figure 6:
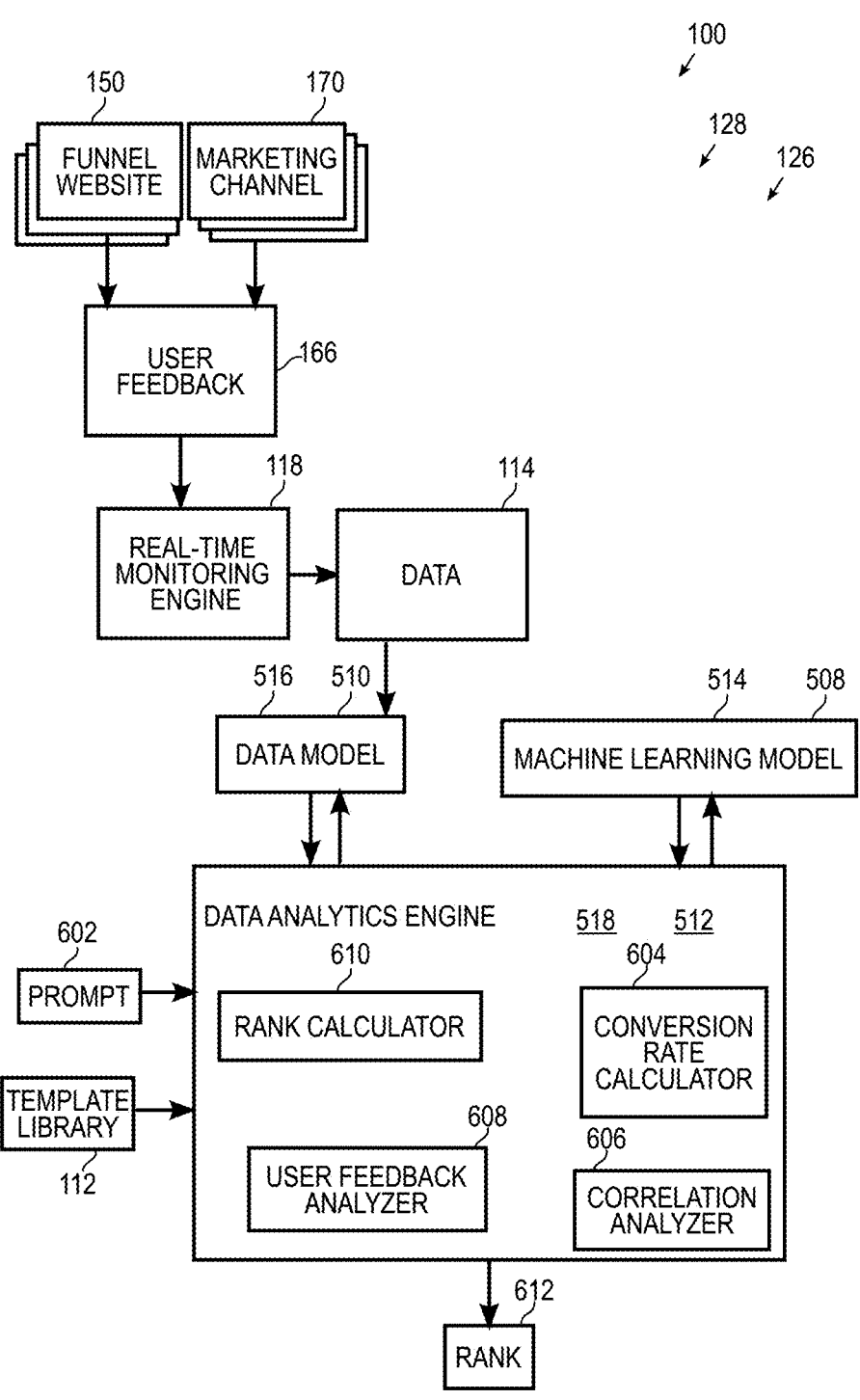
FIG. 6 is a simplified block diagram illustrating yet other example details of the funnel website application, according to some embodiments of the present disclosure.

FIG. 6 is a simplified block diagram illustrating example details of template selection tool 126 and/or forms generator 128 in funnel website application 100 according to various embodiments. User feedback 166 gathered from funnel websites 150 and/or marketing channels 170 may be captured by real-time monitoring engine 118 and fed to data 114 from where it is synthesized into data model 510 and/or 516.

Note that data model 510 and 516 may be different as they use different aspects of data 114. For example, data model 510 may use data that is relevant to selecting funnel website templates 140; data model 516 may use data that is relevant to generating forms. Data model 510 and/or 516 may be fed to data analytics engine 512 and/or 518, respectively. Machine learning model 508 and/or 514 may be used by data analytics engine 512 and/or 518 to analyze data model 510 and/or 516 according to the requirements in a prompt 602 for funnel website 150. Prompt 602 may be input by a human user or generated appropriately by AI engine 110.

Data analytics engine 512 and/or 518 may include a conversion rate calculator 604, a correlation analyzer 606, a user feedback analyzer 608, and a rank calculator 610. Conversion rate calculator 604 may calculate the conversion rate for visitors to previously generated funnel websites 150. Correlation analyzer 606 may look for correlations between a particular content element such as text 158, graphics 160, and forms 162 and conversion rate (or other indicator of interest). User feedback analyzer 608 may analyze user feedback 166 for positive feedback, negative feedback, etc. to determine, for example, whether a particular content element such as text 158, graphics 160, and forms 162 had an intended effect, or whether a particular UX flow 154 was followed, and such other information. Rank calculator 610 may calculate a rank 612 for various templates in template library 112. Rank 612 may be tailored to the requirements in prompt 602, so that the same funnel website templates 140 may be ranked differently according to different requirements.

Figures 7, 8:
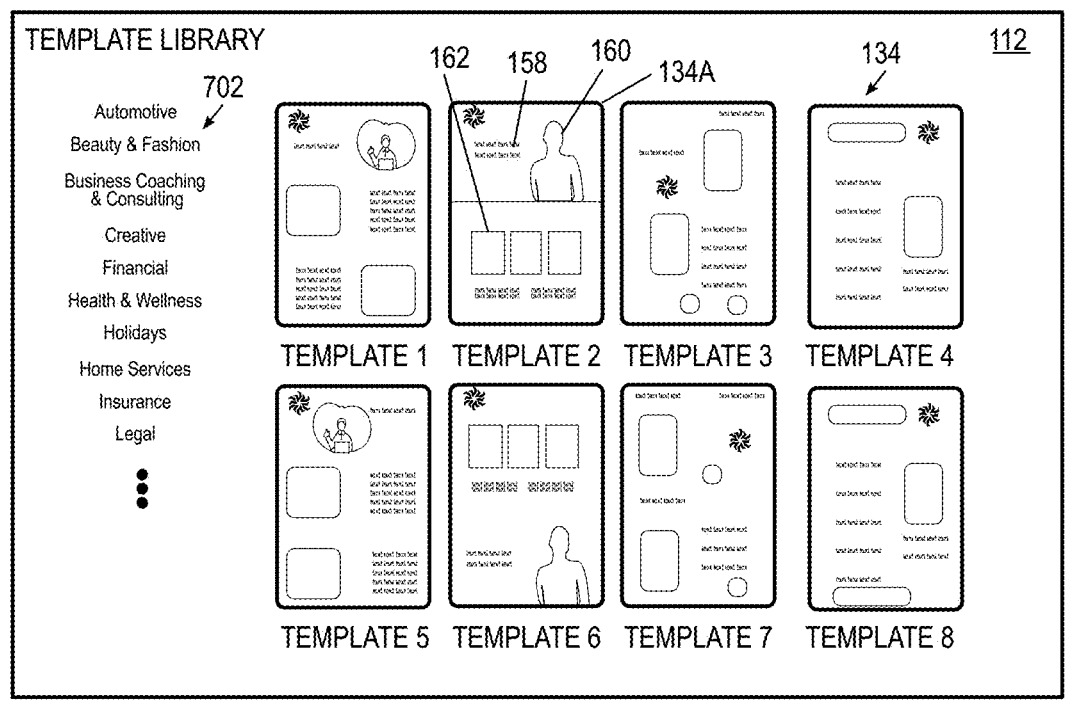
FIG. 7 is a simplified block diagram illustrating yet other example details of the funnel website application, according to some embodiments of the present disclosure.
FIG. 8 is a simplified block diagram illustrating yet other example details of the funnel website application, according to some embodiments of the present disclosure.

FIG. 7 is a simplified block diagram illustrating an example template library 112 according to embodiments of the present disclosure. The figure shows example page templates 134. Page templates 134 may be tagged with various categories 702, such as "automotive," "beauty & fashion," etc. in some embodiments. Each category may indicate a particular theme, format, style, etc. of page templates 134 in that category. An example page template 134a is indicated, which includes text 158, graphics 160 and forms 162 as content elements therein. Page template 134a may specify certain typography, size, color and other settings, the combination of which is different from any other page template 134 in template library 112. Note that funnel templates 136 and forms templates 138 may also be categorized and stored thus in template library 112.

FIG. 8 is a simplified block diagram illustrating an example forms template 138 according to embodiments of the present disclosure. Forms template 138 may comprise various form fields 802 arranged in a unique configuration for each one of forms template 138. In the example form template 138 shown, form fields 802a . . . 802g are arranged as shown. Note that form fields 802 denote elements that are both already filled in and displayed on the form, as also fillable fields and buttons that require user input and/or interaction. For example, form field 802a is a phone number of the business; form field 802b is an email address of the business; form field 802c is a CTA button ("signup") that requires user interaction; form fields 802d are fillable entries that require user input; form field 802e comprises text; form field 802f is an image; form field 802g is a logo image (e.g., PNG image); and so on. Any suitable element may be included in form field 802 within the broad scope of the embodiments. The placement of form fields 802, their stylistic choices (e.g., rectangular button, circular button, etc.), typography, color, and other settings of form template 138 may vary from one form template to another.

Figure 9:
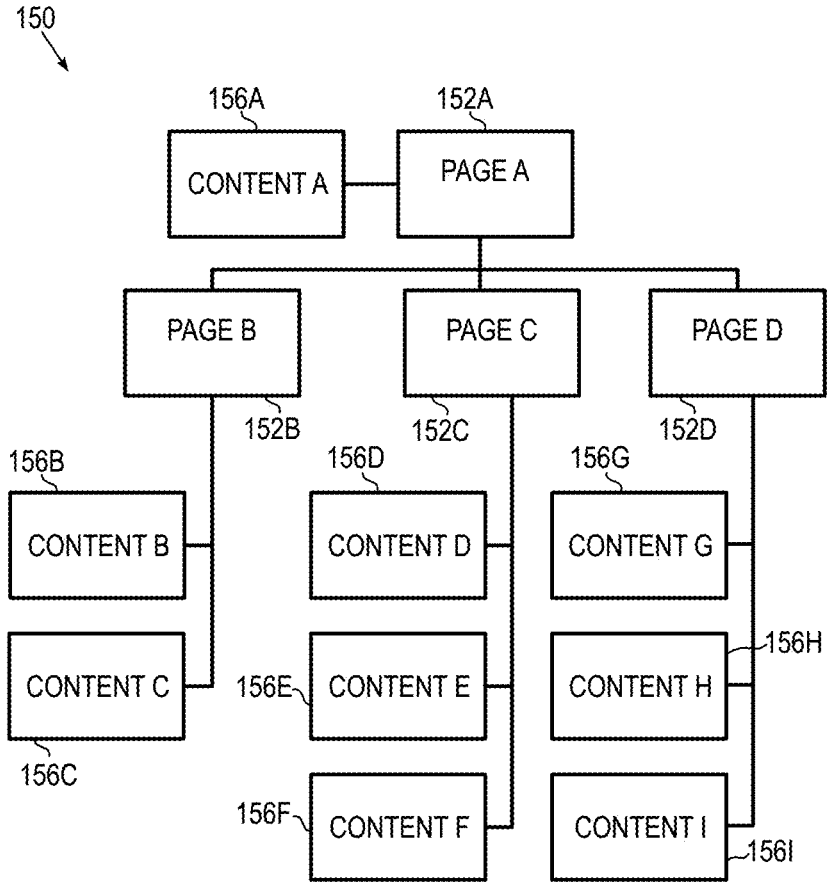
FIG. 9 is a simplified block diagram illustrating yet other example details of the funnel website application, according to some embodiments of the present disclosure.

FIG. 9 is a simplified block diagram illustrating details of example funnel website 150 according to embodiments of the present disclosure. Example funnel website 150 may comprise four pages 152, namely 152a . . . 152d. Page 152a may include content 156a; page 152b may include content 156b and so on. For example, page 152a may comprise a "home" page; page 152b may comprise a "blog" page; page 152c may comprise a "about services" page; page 152d may comprise a "store" page. Content 156 for corresponding page 152 may contain relevant information associated therewith. Each page 152 may comprise different content 156. For example, page 152b, which is a blog page, may contain content 156b comprising an overview of a particular service and content 156c describing various testimonials for the service. Page 152c may comprise content 156d . . . 156f, listing several services available. Page 152d may comprise content 156g . . . 156i, such as a "Purchase" button, logo, textual description, etc. Note that the example provided is merely for illustrative purposes; funnel website 150 may include any number of pages 152 with any number of content 156 within the broad scope of the embodiments.

Figure 10:
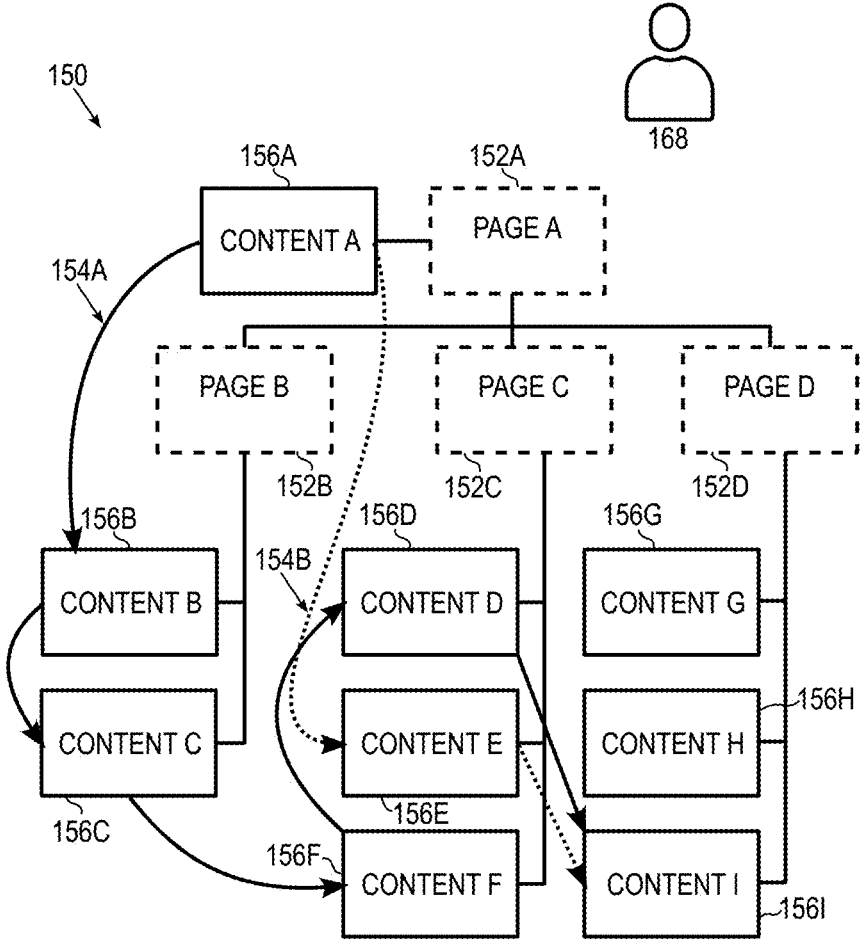
FIG. 10 is a simplified block diagram illustrating yet other example details of the funnel website application, according to some embodiments of the present disclosure.

FIG. 10 is a simplified block diagram illustrating other example details of funnel website 150 of FIG. 9 according to embodiments of the present disclosure. Two example UX flows 154, namely 154a (denoted by continuous lines) and 154b (denoted by dotted lines) are shown as an example, and not as a limitation. Any number of UX flows 154 may be provisioned in funnel website 150 within the broad scope of the embodiments. Example UX flow 154a may take visitor 168 from content 156a on page 152a to content 156b on page 152b, then to content 156c on same page 152b, then to content 156f on page 152c, then to content 156d on page 152c, and finally to content 156i on page 152d. Another example UX flow 154b may take visitor 168 from content 156a on page 152a to content 156e on page 152c, then to content 156i on page 152d. UX flow 154a may be targeted to entice someone who is shopping for various services provided by the business to purchase a particular service, whereas UX flow 154b may be targeted to a returning customer who knows what services to purchase. Note that the example provided is merely for illustrative purposes; funnel website 150 may include any number of pages 152 with any number of UX flows 154 within the broad scope of the embodiments.

In various embodiments, real-time monitoring engine 118 may log user feedback 166, comprising the actual UX flow followed by a visitor and store it as funnel data 522 in data 114. In one example, data analytics engine 512 may analyze funnel data 522 and determine that UX flow 154a is better than UX flow 154b for a spa service in a new locality and rank UX flow 154a higher for the spa's funnel website. In another example, data analytics engine 512 may determine that UX flow 154b is better for a store selling stationery and rank it higher. Thus, the same user feedback data 166 may result in different rankings based upon the requirements provided in prompt 602.

Although the present disclosure has been described in detail with reference to particular arrangements and configurations, these example configurations and arrangements may be changed significantly without departing from the scope of the present disclosure. For example, although the present disclosure has been described with reference to particular network systems such as cloud networks, funnel website application 100 may be applicable to other networks such as LANs. Moreover, although tiered software framework 200 has been illustrated with reference to particular elements and operations that facilitate the software process, these elements, and operations may be replaced by any suitable architecture or process that achieves the intended functionality of funnel website application 100.

Example Methods

FIG. 11 is a simplified flow diagram illustrating example operations 1100 associated with funnel website application 100, according to some embodiments of the present disclosure. At 1102, prompt 602 with requirements for generating funnel website 150 may be received at funnel website application 100. In some other embodiments, prompt 602 may be generated from a request specifying requirements for funnel website 150. At 1104, embeddings such as images and icons may be obtained from third-party graphics 132 according to the requirements. At 1106, semantic search tool 124 may perform a semantic search against template library 112. At 1108, template selection tool 126 may rank templates returned in the search based on learning data 114. At 1110, template selection tool 126 may select the highest ranked template that fulfills the requirements in prompt 602. At 1112, business information for subscriber 106 that requested funnel website 150 may be retrieved. At 1114, the selected funnel website template 140 may be filled with the retrieved business information. At 1116, form generator 128 may select form fields 802 for funnel website 150 based on learning data 114. At 1118, next-ranked funnel website templates 140 for split testing may be selected. At 1120, split testing tool 116 may perform split testing and optimize funnel performance based on user feedback 166.

Figure 12:
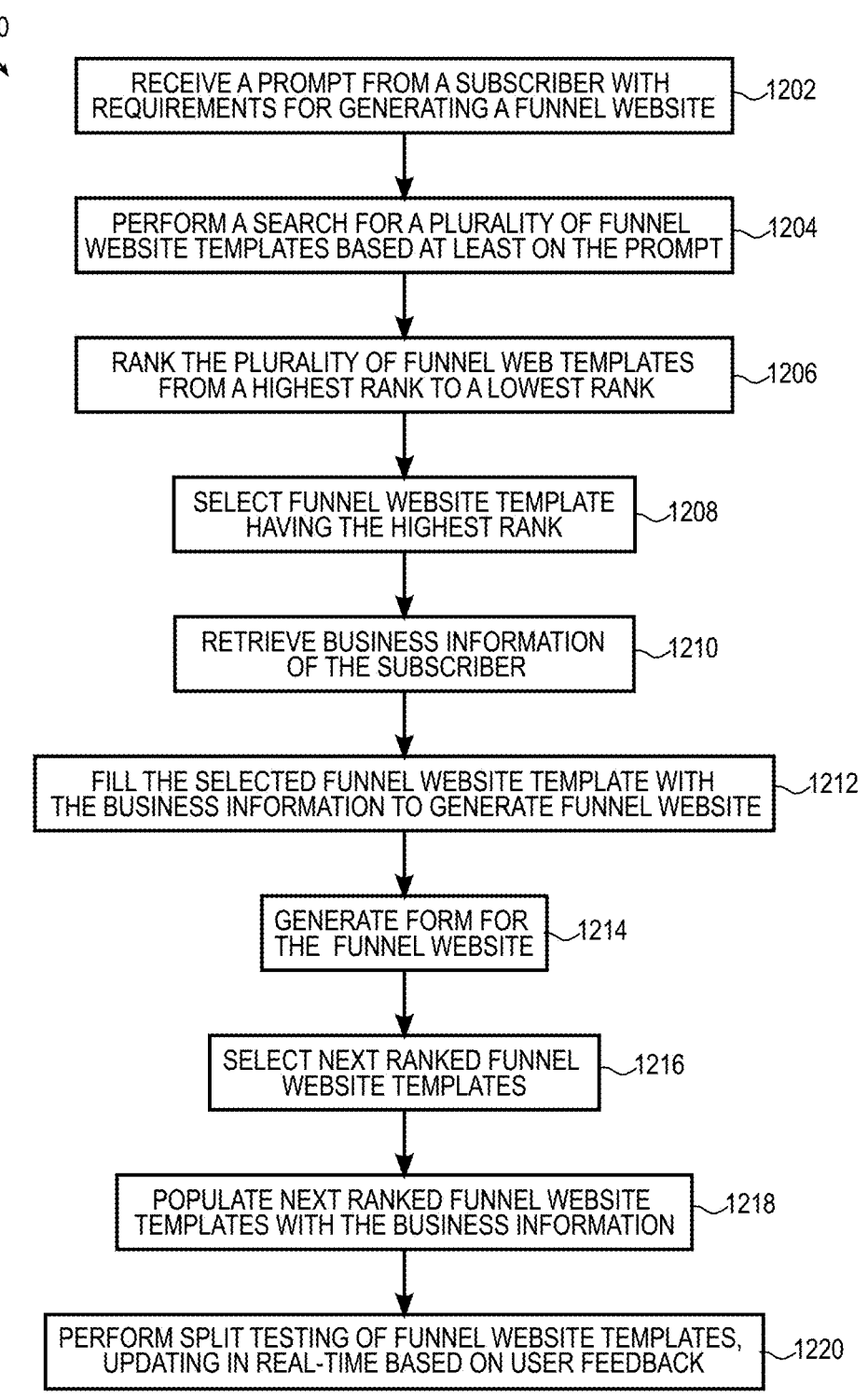
FIG. 12 is a simplified flow diagram illustrating other example operations associated with the funnel website application, according to some embodiments of the present disclosure.

FIG. 12 is a simplified flow diagram illustrating example operations 1200 associated with funnel website application 100, according to some embodiments of the present disclosure. At 1202, prompt 602 from subscriber 106-3a may be received at funnel website application 100 with requirements for generating funnel website 150. At 1204, semantic search tool 124 may perform a search for a plurality of funnel website templates 140 based at least on prompt 602. At 1206, plurality of funnel website templates 140 may be ranked from a highest rank to a lowest rank. At 1208, the funnel website template 140a having the highest rank may be selected. At 1210, business information of subscriber 106-3a may be retrieved. At 1212, the selected funnel website template 140a may be filled with the retrieved business information to generate funnel website 150a. At 1214, a form may be generated for the generated funnel website 150a. At 126, next-ranked funnel website templates 140b . . . 140n may be selected. At 1218, next-ranked funnel website template 140b may be populated with the business information to generate a second funnel website 150b. Split testing of funnel website templates 140a . . . 140n may be performed, updating in real-time based on user feedback 166, until an optimized funnel website 150 is finalized, having the highest conversion rate (or other desired indicator) based on user feedback 166.

FIG. 13 is a simplified flow diagram illustrating example operations 1300 associated with funnel website application 100, according to some embodiments of the present disclosure. At 1302, first tier 102-1, second tier 102-2 and third tier 102-3 may be provided in tiered software framework 200. At 1304, AI engine 110 may be provided at first tier 102-1. At 1306, funnel website templates 140 may be generated at first tier 102-1 based on previously generated funnel websites 150 using AI engine 110. At 1308, using AI engine 110, new funnel websites 150 may be automatically built at first tier 102-1 using funnel website templates 140. At 1310, new funnel websites 150 may be automatically deployed at third tier 102-3. Automatically deploying may comprise publishing new funnel websites 150 at desired domains on the Internet using account credentials at third tier 102-3 of subscribers 106-3 who requested the new funnel websites 150. At 1312, user feedback 166 may be received at third tier 102-3. At 1314, ordered list of funnel website templates 140 according to respective ranks 612 may be created. At 1316, next-ranked funnel website templates 140 may be selected. At 1318, the next-ranked funnel website templates 140 may be populated with appropriate business information. At 1320, split testing of funnel website templates may be automatically performed, updating in real-time based on user feedback 166 until an optimized funnel website 150 is finalized, having the highest conversion rate (or other desired indicator) based on user feedback 166.

In various embodiments, the operations described in FIGS. 11-13 are performed automatically without human intervention apart from users 168 interacting with funnel website 150. Although FIGS. 11-13 illustrate various operations performed in a particular order, this is simply illustrative, and the operations discussed herein may be reordered and/or repeated as suitable. Further, additional operations which are not illustrated may also be performed without departing from the scope of the present disclosure. Also, various ones of the operations discussed herein with respect to FIGS. 11-13 may be modified in accordance with the present disclosure to automatically generate funnel website 150 as disclosed herein. Although various operations are illustrated in FIGS. 11-13 once each, the operations may be repeated as often as desired.

It is important to note that the operations described with reference to the preceding figures illustrate only some of the possible scenarios that may be executed by, or within, funnel website application 100. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion.

Select Examples

Example 1 provides a method for automatically building funnel websites using artificial intelligence (AI) in a tiered software framework, the method comprising: receiving at a tiered software framework, a prompt with requirements for generating a funnel website, in which: the tiered software framework includes data from accounts of a plurality of subscribers, and the requirements are from one subscriber in the plurality of subscribers; performing, by an AI engine in the tiered software framework, a search for a plurality of funnel website templates based at least on the prompt; ranking, by the AI engine, the plurality of funnel website templates returned in the search from a highest rank to a lowest rank, in which: the ranking is based at least on conversion rates for previously generated funnel websites associated with subscribers in the plurality of subscribers sharing at least one commonality with the one subscriber, the conversion rates are automatically calculated in the tiered software framework from real-time monitoring of user feedback on the previously generated funnel websites and marketing channels integrated with the tiered software framework, and the highest rank is associated with a higher conversion rate than the lowest rank; selecting, by the AI engine, a funnel website template having the highest rank;

retrieving business information of the one subscriber; filling the selected funnel website template with the business information to generate the funnel website; and deploying the funnel website at one of a plurality of tiers of the tiered software framework.

Example 2 provides the method of example 1, in which: the highest ranked funnel website template is a first funnel website template, the funnel website is a first funnel website, the first funnel website is deployed on a first group of users, and the method further comprises: split testing the first funnel website with a second funnel website, the split testing comprising: generating the second funnel website from a second funnel website template, the second funnel website templates selected from the plurality of funnel website templates as having a second rank immediately succeeding a first rank of the first funnel website template; deploying the second funnel website on a second group of users; comparing a first conversion rate of the first funnel website with a second conversion rate of the second funnel website; and responsive to determining that the first conversion rate is less than the second conversion rate, replacing the first funnel website with the second funnel website; and repeating the split testing with another second funnel website until the second conversion rate is less than the first conversion rate.

Example 3 provides the method of any one of examples 1-2, in which the ranking is targeted to meet the requirements.

Example 4 provides the method of any one of examples 1-3, in which: the search is performed against a template library, the template library comprises a first plurality of page templates, a second plurality of funnel templates and a third plurality of form templates, and selections from the first plurality of page templates, the second plurality of funnel templates and the third plurality of form templates are stitched together to generate the plurality of funnel website templates.

Example 5 provides the method of any one of examples 1-4, in which the search is a semantic search using the prompt.

Example 6 provides the method of any one of examples 1-5, further comprising generating a form for the selected funnel website, the generating comprising: selecting a category of the form based on the business information of the one subscriber, identifying form fields in the selected category of the form; correlating the identified form fields to user feedback, the user feedback including at least conversion rates; selecting a subset of the identified form fields, the form fields in the selected subset having higher positive user feedback than other unselected form fields; and stitching the selected form fields together.

Example 7 provides the method of example 6, in which selecting the category comprises: identifying subscribers sharing at least one commonality with the one subscriber by comparing the business information of the one subscriber with data of other subscribers; determining frequency of form categories in previously generated funnel websites associated with the identified subscribers; and choosing the category with highest frequency that meets greatest number of requirements of the funnel website.

Example 8 provides the method of any one of examples 1-7, further comprising generating content for the funnel website based on the prompt, in which the search for the plurality of funnel website templates is performed based further on the generated content.

Example 9 provides the method of any one of examples 1-8, in which the marketing channels comprise at least two of the following: email campaigns; short message service (SMS) texts; Voice over Internet Protocol (VOIP) calls; social media accounts; and digital advertisements.

Example 10 provides the method of any one of examples 1-9, in which the funnel website comprises a plurality of pages and a user experience (UX) flow connecting different portions of content on the plurality of pages.

Example 11. Non-transitory computer-readable tangible media that includes instructions for execution, which when executed by a processor of a computing device, is operable to perform operations comprising: receiving at a tiered software framework, a prompt with requirements for generating a funnel website, in which: the tiered software framework includes data from accounts of a plurality of subscribers, and the requirements are from one subscriber in the plurality of subscribers; performing, by an AI engine in the tiered software framework, a search for a plurality of funnel website templates based at least on the prompt; ranking, by the AI engine, the plurality of funnel website templates returned in the search from a highest rank to a lowest rank, in which: the ranking is based at least on conversion rates for previously generated funnel websites associated with subscribers in the plurality of subscribers sharing at least one commonality with the one subscriber, the conversion rates are automatically calculated in the tiered software framework from real-time monitoring of user feedback on the previously generated funnel websites and marketing channels integrated with the tiered software framework, and the highest rank is associated with a higher conversion rate than the lowest rank; selecting, by the AI engine, a funnel website template having the highest rank; retrieving business information of the one subscriber; filling the selected funnel website template with the business information to generate the funnel website; and deploying the funnel website at one of a plurality of tiers of the tiered software framework.

Example 12 provides the non-transitory computer-readable tangible media of example 11, in which: the highest ranked funnel website template is a first funnel website template, the funnel website is a first funnel website, the first funnel website is deployed on a first group of users, and the operations further comprise: split testing the first funnel website with a second funnel website, the split testing comprising: generating the second funnel website from a second funnel website template, the second funnel website templated selected from the plurality of funnel website templates as having a second rank immediately succeeding a first rank of the first funnel website template; deploying the second funnel website on a second group of users; comparing a first conversion rate of the first funnel website with a second conversion rate of the second funnel website; and responsive to determining that the first conversion rate is less than the second conversion rate, replacing the first funnel website with the second funnel website; and repeating the split testing with another second funnel website until the second conversion rate is less than the first conversion rate.

Example 13 provides the non-transitory computer-readable tangible media of any one of examples 11-12, in which the ranking is targeted to meet the requirements.

Example 14 provides the non-transitory computer-readable tangible media of any one of examples 11-13, in which: the search is performed against a template library, the template library comprises a first plurality of page templates, a second plurality of funnel templates and a third plurality of form templates, and selections from the first plurality of page templates, the second plurality of funnel templates and the third plurality of form templates are stitched together to generate the plurality of funnel website templates.

Example 15 provides the non-transitory computer-readable tangible media of any one of examples 11-14, in which the search is a semantic search using the prompt.

Example 16 provides the non-transitory computer-readable tangible media of any one of examples 11-15, the operations further comprising generating a form for the selected funnel website, the generating comprising: selecting a category of the form based on the business information of the one subscriber, identifying form fields in the selected category of the form; correlating the identified form fields to user feedback, the user feedback including at least conversion rates; selecting a subset of the identified form fields, the form fields in the selected subset having higher positive user feedback than other unselected form fields; and stitching the selected form fields together.

Example 17 provides the non-transitory computer-readable tangible media of example 16, in which selecting the category comprises: identifying subscribers sharing at least one commonality with the one subscriber by comparing the business information of the one subscriber with data of other subscribers; determining frequency of form categories in previously generated funnel websites associated with the identified subscribers; and choosing the category with highest frequency that meets greatest number of requirements of the funnel website.

Example 18 provides the non-transitory computer-readable tangible media of any one of examples 11-17, the operations further comprising generating content for the funnel website based on the prompt, in which the search for the plurality of funnel website templates is performed based further on the generated content.

Example 19 provides the non-transitory computer-readable tangible media of any one of examples 11-18, in which the marketing channels comprise at least two of the following: email campaigns; short message service (SMS) texts; Voice over Internet Protocol (VOIP) calls; social media accounts; and digital advertisements.

Example 20 provides the non-transitory computer-readable tangible media of any one of examples 11-19, in which the funnel website comprises a plurality of pages and a user experience (UX) flow connecting different portions of content on the plurality of pages.

Example 21 provides an apparatus comprising: a processing circuitry; a memory storing data; and a communication circuitry, in which the processing circuitry executes instructions associated with the data, the processing circuitry is coupled to the communication circuitry and the memory, and the processing circuitry and the memory cooperate, such that the apparatus is configured for: receiving at a tiered software framework, a prompt with requirements for generating a funnel website, in which: the tiered software framework includes data from accounts of a plurality of subscribers, and the requirements are from one subscriber in the plurality of subscribers; performing, by an AI engine in the tiered software framework, a search for a plurality of funnel website templates based at least on the prompt; ranking, by the AI engine, the plurality of funnel website templates returned in the search from a highest rank to a lowest rank, in which: the ranking is based at least on conversion rates for previously generated funnel websites associated with subscribers in the plurality of subscribers sharing at least one commonality with the one subscriber, the conversion rates are automatically calculated in the tiered software framework from real-time monitoring of user feedback on the previously generated funnel websites and marketing channels integrated with the tiered software framework, and the highest rank is associated with a higher conversion rate than the lowest rank; selecting, by the AI engine, a funnel website template having the highest rank; retrieving business information of the one subscriber; filling the selected funnel website template with the business information to generate the funnel website; and deploying the funnel website at one of a plurality of tiers of the tiered software framework.

Example 22 provides the apparatus of example 21, in which: the highest ranked funnel website template is a first funnel website template, the funnel website is a first funnel website, the first funnel website is deployed on a first group of users, and the apparatus is further configured for: split testing the first funnel website with a second funnel website, the split testing comprising: generating the second funnel website from a second funnel website template, the second funnel website templated selected from the plurality of funnel website templates as having a second rank immediately succeeding a first rank of the first funnel website template; deploying the second funnel website on a second group of users; comparing a first conversion rate of the first funnel website with a second conversion rate of the second funnel website; and responsive to determining that the first conversion rate is less than the second conversion rate, replacing the first funnel website with the second funnel website; and repeating the split testing with another second funnel website until the second conversion rate is less than the first conversion rate.

Example 23 provides the apparatus of any one of examples 21-22, in which the ranking is targeted to meet the requirements.

Example 24 provides the apparatus of any one of examples 21-23, in which: the search is performed against a template library, the template library comprises a first plurality of page templates, a second plurality of funnel templates and a third plurality of form templates, and selections from the first plurality of page templates, the second plurality of funnel templates and the third plurality of form templates are stitched together to generate the plurality of funnel website templates.

Example 25 provides the apparatus of any one of examples 21-24, in which the search is a semantic search using the prompt.

Example 26 provides the apparatus of any one of examples 21-25, further comprising generating a form for the selected funnel website, the generating comprising: selecting a category of the form based on the business information of the one subscriber, identifying form fields in the selected category of the form; correlating the identified form fields to user feedback, the user feedback including at least conversion rates; selecting a subset of the identified form fields, the form fields in the selected subset having higher positive user feedback than other unselected form fields; and stitching the selected form fields together.

Example 27 provides the apparatus of example 26, in which selecting the category comprises: identifying subscribers sharing at least one commonality with the one subscriber by comparing the business information of the one subscriber with data of other subscribers; determining frequency of form categories in previously generated funnel websites associated with the identified subscribers; and choosing the category with highest frequency that meets greatest number of requirements of the funnel website.

Example 28 provides the apparatus of any one of examples 21-27, further comprising generating content for the funnel website based on the prompt, in which the search for the plurality of funnel website templates is performed based further on the generated content.

Example 29 provides the apparatus of any one of examples 21-28, in which the marketing channels comprise at least two of the following: email campaigns; short message service (SMS) texts; Voice over Internet Protocol (VoIP) calls; social media accounts; and digital advertisements.

Example 30 provides the apparatus of any one of examples 21-29, in which the funnel website comprises a plurality of pages and a user experience (UX) flow connecting different portions of content on the plurality of pages.

Example 31 provides a method for automatically building funnel websites using artificial intelligence (AI) in a tiered software framework, the method comprising: providing a first tier, a second tier and a third tier in a software framework, in which: data in the first tier is accessible at the first tier and inaccessible at the second tier and the third tier, data in the second tier is accessible at the first tier and the second tier and inaccessible at the third tier, and data in the third tier is accessible at the first tier, the second tier and the third tier; providing, at the first tier, an AI engine; automatically generating, at the first tier using the AI engine, funnel website templates based on previously generated funnel websites; automatically building, at the first tier using the AI engine, new funnel websites for subscribers at the third tier using the funnel website templates; and automatically deploying the new funnel websites at the third tier.

Example 32 provides the method of example 31, further comprising receiving, at the third tier, user feedback from the new funnel websites, the user feedback comprising at least conversion rates of visitors at the new funnel websites.

Example 33 provides the method of any one of examples 31-32, in which: automatically generating the funnel website templates is based at least on user feedback of the previously generated funnel websites, the user feedback comprises at least conversion rates of visitors at the previously generated funnel websites, and the user feedback is received at the third tier.

Example 34 provides the method of any one of examples 31-33, further comprising automatically split testing the new funnel websites at the third tier.

Example 35 provides the method of any one of examples 31-34, in which each funnel website comprises one or more pages and a user experience (UX) flow connecting different portions of content on the one or more pages.

Example 36. Non-transitory computer-readable tangible media that includes instructions for execution, which when executed by a processor of a computing device, is operable to perform operations comprising: providing a first tier, a second tier and a third tier in a software framework, in which: data in the first tier is accessible at the first tier and inaccessible at the second tier and the third tier, data in the second tier is accessible at the first tier and the second tier and inaccessible at the third tier, and data in the third tier is accessible at the first tier, the second tier and the third tier; providing, at the first tier, an AI engine; automatically generating, at the first tier using the AI engine, funnel website templates based on previously generated funnel websites; automatically building, at the first tier using the AI engine, new funnel websites for subscribers at the third tier using the funnel website templates; and automatically deploying the new funnel websites at the third tier.

Example 37 provides the non-transitory computer-readable tangible media of example 36, in which the operations further comprise receiving, at the third tier, user feedback from the new funnel websites, the user feedback comprising at least conversion rates of visitors at the new funnel websites.

Example 38 provides the non-transitory computer-readable tangible media of any one of examples 36-37, in which: automatically generating the funnel website templates is based at least on user feedback of the previously generated funnel websites, the user feedback comprises at least conversion rates of visitors at the previously generated funnel websites, and the user feedback is received at the third tier.

Example 39 provides the non-transitory computer-readable tangible media of any one of examples 36-38, in which the operations further comprise automatically split testing the new funnel websites at the third tier.

Example 40 provides the non-transitory computer-readable tangible media of any one of examples 36-39, in which each funnel website comprises one or more pages and a user experience (UX) flow connecting different portions of content on the one or more pages.

Example 41 provides an apparatus comprising: a processing circuitry; a memory storing data; and a communication circuitry, in which the processing circuitry executes instructions associated with the data, the processing circuitry is coupled to the communication circuitry and the memory, and the processing circuitry and the memory cooperate, such that the apparatus is configured for: providing a first tier, a second tier and a third tier in a software framework, in which: data in the first tier is accessible at the first tier and inaccessible at the second tier and the third tier, data in the second tier is accessible at the first tier and the second tier and inaccessible at the third tier, and data in the third tier is accessible at the first tier, the second tier and the third tier; providing, at the first tier, an AI engine; automatically generating, at the first tier using the AI engine, funnel website templates based on previously generated funnel websites; automatically building, at the first tier using the AI engine, new funnel websites for subscribers at the third tier using the funnel website templates; and automatically deploying the new funnel websites at the third tier.

Example 42 provides the apparatus of example 41, further configured for receiving, at the third tier, user feedback from the new funnel websites, the user feedback comprising at least conversion rates of visitors at the new funnel websites.

Example 43 provides the apparatus of any one of examples 41-42, in which: automatically generating the funnel website templates is based at least on user feedback of the previously generated funnel websites, the user feedback comprises at least conversion rates of visitors at the previously generated funnel websites, and the user feedback is received at the third tier.

Example 44 provides the apparatus of any one of examples 41-43, further configured for automatically split testing the new funnel websites at the third tier.

Example 45 provides the apparatus of any one of examples 41-44, in which each funnel website comprises one or more pages and a user experience (UX) flow connecting different portions of content on the one or more pages.

The above description of illustrated implementations of the disclosure, including what is described in the abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize.

The invention claimed is:

1. A method for automatically building funnel websites using artificial intelligence (AI) in a tiered software framework, the method comprising:

providing a first tier, a second tier and a third tier in the software framework, wherein: data in the first tier is accessible at the first tier and inaccessible at the second tier and the third tier, data in the second tier is accessible at the first tier and the second tier and inaccessible at the third tier, and data in the third tier is accessible at the first tier, the second tier and the third tier;

providing, at the first tier, an AI engine;

automatically generating, at the first tier using the AI engine, funnel website templates based on previously generated funnel websites;

automatically building, at the first tier using the AI engine, a new funnel website using the funnel website templates for a subscriber to the third tier using data of the subscriber; and automatically deploying the new funnel website at the third tier.

2. The method of claim 1, further comprising receiving, at the third tier, user feedback from the new funnel website, the user feedback comprising at least conversion rates of visitors at the new funnel website.

3. The method of claim 1, wherein:

automatically generating the funnel website templates is based at least on user feedback of the previously generated funnel websites, the user feedback comprises at least conversion rates of visitors at the previously generated funnel websites, and the user feedback is received at the third tier.

4. The method of claim 1, wherein:

user feedback from the new funnel website is categorized, stored, and accessible at the third tier according to access credentials of the subscriber, and the user feedback is inaccessible by other access credentials of other subscribers to the third tier.

5. The method of claim 1, wherein:

the previously generated funnel websites are for other subscribers to the third tier, and the previously generated funnel websites use data of the corresponding subscribers.

6. The method of claim 1, wherein the new funnel website comprises one or more pages and a user experience (UX) flow connecting different portions of content on the one or more pages.

7. The method of claim 1, further comprising automatically split testing the new funnel website at the third tier.

8. Non-transitory computer-readable tangible media that includes instructions for execution, which when executed by a processor of a computing device, is operable to perform operations comprising:

providing a first tier, a second tier and a third tier in a software framework, wherein: data in the first tier is accessible at the first tier and inaccessible at the second tier and the third tier, data in the second tier is accessible at the first tier and the second tier and inaccessible at the third tier, and data in the third tier is accessible at the first tier, the second tier and the third tier;

providing, at the first tier, an AI engine;

automatically generating, at the first tier using the AI engine, funnel website templates based on previously generated funnel websites;

automatically building, at the first tier using the AI engine, a new funnel website using the funnel website templates for a subscriber to the third tier using data of the subscriber; and automatically deploying the new funnel website at the third tier.

9. The non-transitory computer-readable tangible media of claim 8, wherein the operations further comprise receiving, at the third tier, user feedback from the new funnel website, the user feedback comprising at least conversion rates of visitors at the new funnel website.

10. The non-transitory computer-readable tangible media of claim 8, wherein:

automatically generating the funnel website templates is based at least on user feedback of the previously generated funnel websites, the user feedback comprises at least conversion rates of visitors at the previously generated funnel websites, and the user feedback is received at the third tier.

11. The non-transitory computer-readable tangible media of claim 8, wherein:

user feedback from the new funnel website is categorized, stored, and accessible at the third tier according to access credentials of the subscriber, and the user feedback is inaccessible by other access credentials of other subscribers to the third tier.

12. The non-transitory computer-readable tangible media of claim 8, wherein:

the previously generated funnel websites are for other subscribers to the third tier, and the previously generated funnel websites use data of the corresponding subscribers.

13. The non-transitory computer-readable tangible media of claim 8, wherein the new funnel website comprises one or more pages and a user experience (UX) flow connecting different portions of content on the one or more pages.

14. The non-transitory computer-readable tangible media of claim 8, the operations further comprising automatically split testing the new funnel website at the third tier.

15. An apparatus comprising:

a processing circuitry;

a memory storing data; and a communication circuitry, wherein the processing circuitry executes instructions associated with the data, the processing circuitry is coupled to the communication circuitry and the memory, and the processing circuitry and the memory cooperate, such that the apparatus is configured for:

providing a first tier, a second tier and a third tier in a software framework, wherein: data in the first tier is accessible at the first tier and inaccessible at the second tier and the third tier, data in the second tier is accessible at the first tier and the second tier and inaccessible at the third tier, and data in the third tier is accessible at the first tier, the second tier and the third tier;

providing, at the first tier, an AI engine;

automatically generating, at the first tier using the AI engine, funnel website templates based on previously generated funnel websites;

automatically building, at the first tier using the AI engine, a new funnel website using the funnel website templates for a subscriber to the third tier using data of the subscriber; and automatically deploying the new funnel website at the third tier.

16. The apparatus of claim 15, further configured for receiving, at the third tier, user feedback from the new funnel website, the user feedback comprising at least conversion rates of visitors at the new funnel website.

17. The apparatus of claim 16, wherein:

automatically generating the funnel website templates is based at least on user feedback of the previously generated funnel websites, the user feedback comprises at least conversion rates of visitors at the previously generated funnel websites, and the user feedback is received at the third tier.

18. The apparatus of claim 15, wherein:

user feedback from the new funnel website is categorized, stored, and accessible at the third tier according to access credentials of the subscriber, and the user feedback is inaccessible by other access credentials of other subscribers to the third tier.

19. The apparatus of claim 15, wherein selecting the funnel website template includes generating the selected funnel website template, comprising:

the previously generated funnel websites are for other subscribers to the third tier, and the previously generated funnel websites use data of the corresponding subscribers.

20. The apparatus of claim 15, further configured for automatically split testing the new funnel website at the third tier.

\* \* \* \* \*